(12) United States Patent
Eldridge et al.

(10) Patent No.: US 9,158,508 B2
(45) Date of Patent: Oct. 13, 2015

(54) STRATEGY EDITOR FOR PROCESS CONTROL SUPPORTING DRAG AND DROP CONNECTIONS TO DECLARATIONS

(71) Applicant: Invensys Systems, Inc., Foxboro, MA (US)

(72) Inventors: Keith E. Eldridge, North Easton, MA (US); James William Hemenway, West Wareham, MA (US); Franciscus Marie Middeldorp, Foxboro, MA (US)

(73) Assignee: Invensys Systems, Inc., Foxboro, MA (US)

(*) Notice: Subject to any disclaimer, the term of this patent is extended or adjusted under 35 U.S.C. 154(b) by 0 days.

(21) Appl. No.: 14/482,694

(22) Filed: Sep. 10, 2014

(65) Prior Publication Data

US 2015/0046900 A1    Feb. 12, 2015

Related U.S. Application Data

(63) Continuation of application No. 11/403,222, filed on Apr. 11, 2006, now abandoned.

(51) Int. Cl.
| | | |
|---|---|---|
| *G06F 3/00* | (2006.01) | |
| *G06F 3/048* | (2013.01) | |
| *G06F 9/44* | (2006.01) | |
| *G06F 3/0486* | (2013.01) | |
| *G06F 17/00* | (2006.01) | |
| *G06F 17/20* | (2006.01) | |
| *G06F 17/21* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/27* | (2006.01) | |
| *G06F 17/28* | (2006.01) | |

(52) U.S. Cl.
CPC .............. *G06F 8/34* (2013.01); *G06F 3/0486* (2013.01)

(58) Field of Classification Search
None
See application file for complete search history.

(56) References Cited

U.S. PATENT DOCUMENTS

| 4,831,582 | A  | * | 5/1989 | Miller et al. | 1/1 |
|---|---|---|---|---|---|
| 5,398,336 | A  | * | 3/1995 | Tantry et al. | 1/1 |
| 5,555,357 | A  | * | 9/1996 | Fernandes et al. | 345/441 |
| 5,966,532 | A  | * | 10/1999 | McDonald et al. | 717/105 |
| 6,078,320 | A  | * | 6/2000 | Dove et al. | 715/866 |
| 7,134,086 | B2 | * | 11/2006 | Kodosky | 715/763 |
| 7,395,131 | B2 | * | 7/2008 | Funk | 700/108 |
| 2002/0152289 | A1 | * | 10/2002 | Dube | 709/220 |
| 2004/0001092 | A1 | * | 1/2004 | Rothwein et al. | 345/763 |
| 2006/0209084 | A1 | * | 9/2006 | Wong et al. | 345/629 |
| 2006/0253792 | A1 | * | 11/2006 | Grace et al. | 715/771 |
| 2007/0233323 | A1 | * | 10/2007 | Wiemeyer et al. | 700/276 |

FOREIGN PATENT DOCUMENTS

WO     WO2005109123      * 11/2005

* cited by examiner

*Primary Examiner* — Yongjia Pan
(74) *Attorney, Agent, or Firm* — Thomas J. Roth, Esq.

(57) ABSTRACT

Enhancements to a strategy object editor for creating and modifying control strategies for process control systems (both distributed and discrete) is described. The improvements include: supporting a set of graphical depictions for individual control object (modified by an appearance object editor), drag and drop connections for declarations that connect control strategies to other control strategies, GUI-based designation of object execution order, automatically applied line styles based upon connection data type, and automatic modification of elements within an appearance object to accommodate a moved attribute.

14 Claims, 12 Drawing Sheets

| AppearanceObject (all appearance objects presently defined for the strategy object ) | 300 |
|---|---|
| BlockData | 302 |
| DeclarationsData | 304 |
| Diagram | 306 |
| ExecutionOrder | 308 |
| FBM Channels | 310 |
| IOBlocks | 314 |
| LinkedToTemplate | 316 |
| ModifiedOutsideEditor | 318 |
| Period | 320 |
| Phase | 322 |
| Prefix | 324 |
| GraphicsGUID | 326 |

FIG. 3a

| AppearanceObject | 350 |
|---|---|
| AppearanceObjectsList | 352 |
| XmlDefaultAppearance | 354 |
| XMLDescription | 356 |
| Stencils | 358 |

FIG. 3b

| | |
|---|---|
| CreateUniqueBlockName( ) | 400 |
| CreateBlock( ) | 402 |
| RemoveBlock( ) | 404 |
| RenameBlock( ) | 406 |
| CreateUniqueDeclarationName() | 408 |
| CreateDeclaration( ) | 410 |
| RemoveDeclaration( ) | 414 |
| RenameDeclaration( ) | 416 |
| CreateUniqueStrategyName( ) | 418 |
| CreateChildStrategy( ) | 420 |
| RemoveChildStrategy( ) | 422 |
| RenameChildStrategy( ) | 424 |
| AddBlockIOAssignment ( ) | 426 |
| RemoveBlockIOAssignments( ) | 428 |
| Compile( ) | 430 |
| UpdatedFromParent( ) | 432 |
| DetachFromParent( ) | 434 |
| Name | 436 |
| GUID | 438 |
| Reference | 440 |
| Type | 442 |
| Locked | 444 |
| UpdatedFromParent( ) | 446 |
| DetachFromParent( ) | 448 |
| DefaultInputAttributes | 450 |
| DefaultOutputAttributes | 452 |
| AllAttributes | 454 |
| AppearanceObject | 456 |

FIG. 4

| Administrative Functions | |
|---|---|
| Initialize | 500 |
| LoadDefaultStencils | 502 |
| BuildDefaultAO | 504 |
| CenterAO | 506 |
| AddParameters | 508 |
| GetDefaultIOParameters | 510 |
| CalculateAOReadOnlyStatus | 512 |
| Control Functions | |
| Initialize | 520 |
| DataChange | 522 |
| Apply | 524 |
| Close | 526 |
| Appearance Object Editor Functions | |
| UpdateEditorUI | 530 |
| UpdateUpdateAOBtnStatus | 532 |
| UpdateFinishFrameBtnStatus | 534 |
| btnResetAO_Click | 536 |
| btnEditAO_Click | 538 |
| btnBuild_Click | 540 |
| btnFinish_Click | 542 |
| Page Maintenance | |
| OnAddNewPage | 550 |
| OnDeletePage | 552 |

FIG. 5

STRATEGY EDITOR FOR PROCESS CONTROL SUPPORTING DRAG AND DROP CONNECTIONS TO DECLARATIONS

CROSS-REFERENCE TO RELATED APPLICATIONS

This application is a continuation of Eldridge et al., U.S. patent application Ser. No. 11/403,222, filed on Apr. 11, 2006, entitled "STRATEGY EDITOR FOR PROCESS CONTROL SUPPORTING DRAG AND DROP CONNECTIONS TO DECLARATIONS," the contents of which are expressly incorporated herein by reference in their entirety, including any references therein.

This application relates to Eldridge et al., U.S. patent application Ser. No. 11/403,225, filed on Apr. 11, 2006, entitled "APPEARANCE OBJECTS FOR CONFIGURING AND GRAPHICALLY DISPLAYING PROGRAMMED/CONFIGURED PROCESS CONTROL," the contents of which are expressly incorporated herein by reference in their entirety, including any references therein.

This application relates to Eldridge et al., U.S. patent application Ser. No. 11/403,227, filed on Apr. 11, 2006, entitled "A STRATEGY EDITOR SUPPORTING DESIGNATING EXECUTION ORDER VIA CONTROL OBJECT GRAPHICAL REPRESENTATIONS," the contents of which are expressly incorporated herein by reference in their entirety, including any references therein.

This application relates to Eldridge et al., U.S. patent application Ser. No. 11/403,067, filed on Apr. 11, 2006, entitled "A STRATEGY EDITOR SUPPORTING AUTOMATIC DESIGNATION OF DISPLAYED LINE STYLE BASED UPON A CONNECTION DATA TYPE," the contents of which are expressly incorporated herein by reference in their entirety, including any references therein.

This application relates to Eldridge et al., U.S. patent application Ser. No. 11/402,644, filed on Apr. 11, 2006, entitled "AUTOMATIC RESIZING OF MOVED ATTRIBUTE ELEMENTS ON A GRAPHICAL REPRESENTATION OF A CONTROL OBJECT," the contents of which are expressly incorporated herein by reference in their entirety, including any references therein.

FIELD OF THE INVENTION

The present invention generally relates to the field of programmable/configurable computerized control systems. More particularly, the invention concerns application programs including graphical interfaces for creating/configuring control programs for continuous and/or discrete processes.

BACKGROUND

Industry increasingly depends upon highly automated data acquisition and control systems to ensure that industrial processes/operations run efficiently, safely and reliably while lowering overall costs. In such systems, data acquisition begins with sensors measuring current values/status of process variables representing the status/operation of an industrial process or operation. The measurements are communicated to programmed controllers and data collection/management systems. The data collection/management systems, generally including process databases and data processing routines, manage and maintain the measurement data. Such data management and maintenance includes further processing the data (e.g., filtering), storing the data, and distributing the data to a variety of client applications. Such client applications include both automated and manual supervisory control processes and display/monitor user interfaces.

Industrial process/operation measurements come in a wide variety of forms and are used by industrial process control systems to regulate a variety of operations, both with respect to continuous and discrete manufacturing processes. By way of example the measurements produced by a sensor/recorder include: a temperature, a pressure, a pH, a mass/volume flow of material, a quantity of bottles filled per hour, a tallied inventory of packages waiting in a shipping line, or a photograph of a room in a factory. Often, sophisticated automated process management and control hardware/software examine acquired process/operation measurement data, and respond by sending messages/signals to actuators/controllers that adjust the operation of at least a portion of the industrial process. The control software comprises, for example, one or more control strategies that, in turn, include a set of control blocks. The control programs potentially operate at a variety of levels of control including, for example, regulatory control (e.g., maintaining a particular specified set point for a process variable) and supervisory control (e.g., specifying a set point for a controlled process variable).

Automated control systems for typical industrial processes are often complex. Developing customized control programs for such automated control systems is, of course, a complex and time-consuming task. However, today control system programming is streamlined and simplified by graphical user interface-based control program development environments/toolkits that allow creation of control programs by dragging and dropping, and thereafter connecting, graphical representations of pre-programmed components/elements of a control program. Such graphical representations are associated with control software objects (or more specifically control software object templates) that, when instantiated and deployed on a control software object execution platform, carry out particular defined operations/functions in an overall control environment.

Programming automated control of processes using graphical editors and sets of selectable, pre-programmed, object templates is a substantial improvement over programming control using written instructions. The graphical user interface-based control program environment has substantially eliminated the need for control engineers to develop control programs using low-level instruction code, or even higher level compiled source code languages. Instead, developers of control programs invoke graphical control program editors having associated pre-programmed control objects represented by symbols provided in a control template pallet. Thus, instead of learning to program control using written instructions/code, programmers need only become knowledgeable with regard to various tasks/functions carried out by control objects instantiated from selectable control object templates.

Known graphical control program editors support an extensible set of control object templates. The new control object templates include new control elements with new attributes/functionality not found in existing control object template sets/pallets. In some instances the new control object templates are derived from existing templates. In other instances, the new control object templates comprise a set of connected, pre-existing, control object templates.

The template-based control development toolkit approach to developing automated control programs does not eliminate low-level programming altogether. Instead, such toolkits facilitate efficient/widespread exploitation, by many, of original, programming efforts of a relatively small number of skilled low-level programmers who develop the original control object templates. Such exploitation occurs in the form of deriving child templates from a base class of original templates, and creating object instances from the original and derived templates.

SUMMARY OF THE INVENTION

In accordance with the present invention, method is disclosed for creating, within a control program development graphical editor facility, a connection between an I/O attribute of a control object graphically represented on a first control strategy canvas and a second control strategy located outside the first control strategy. Such connections are supports by a declaration which acts as a connector between attributes otherwise embedded within two distinct control strategies.

In accordance with the present invention a method of designating and defining a declaration and its associated connected attributes is accomplished by initially specifying a name for the declaration within a declarations area of the editor facility's graphical user interface. Thereafter, a the editor creates a graphical declaration representation of the declaration in response to a user action of selecting the name for the declaration in the declarations area and indicating a location for graphical declaration representation within the first control strategy canvas. Next, a connection is created between the declaration and an I/O attribute of a control object graphically represented in the first control strategy canvas using graphical user interface pointer actions. Finally, the declaration definition is completed by the further step of specifying a connection reference for the declaration in the declarations area.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3a lists an exemplary set of object attributes supported in the strategy object;

FIG. 3b lists an exemplary set of object attributes supported in control objects that support multiple appearance objects providing multiple, user-selectable, depictions for control objects within a control program development interface/environment;

FIG. 4 summarizes an interface supported by a strategy editor and strategy objects;

FIG. 5 summarizes an interface supported by an appearance object editor and appearance objects;

DETAILED DESCRIPTION

Figure 1:
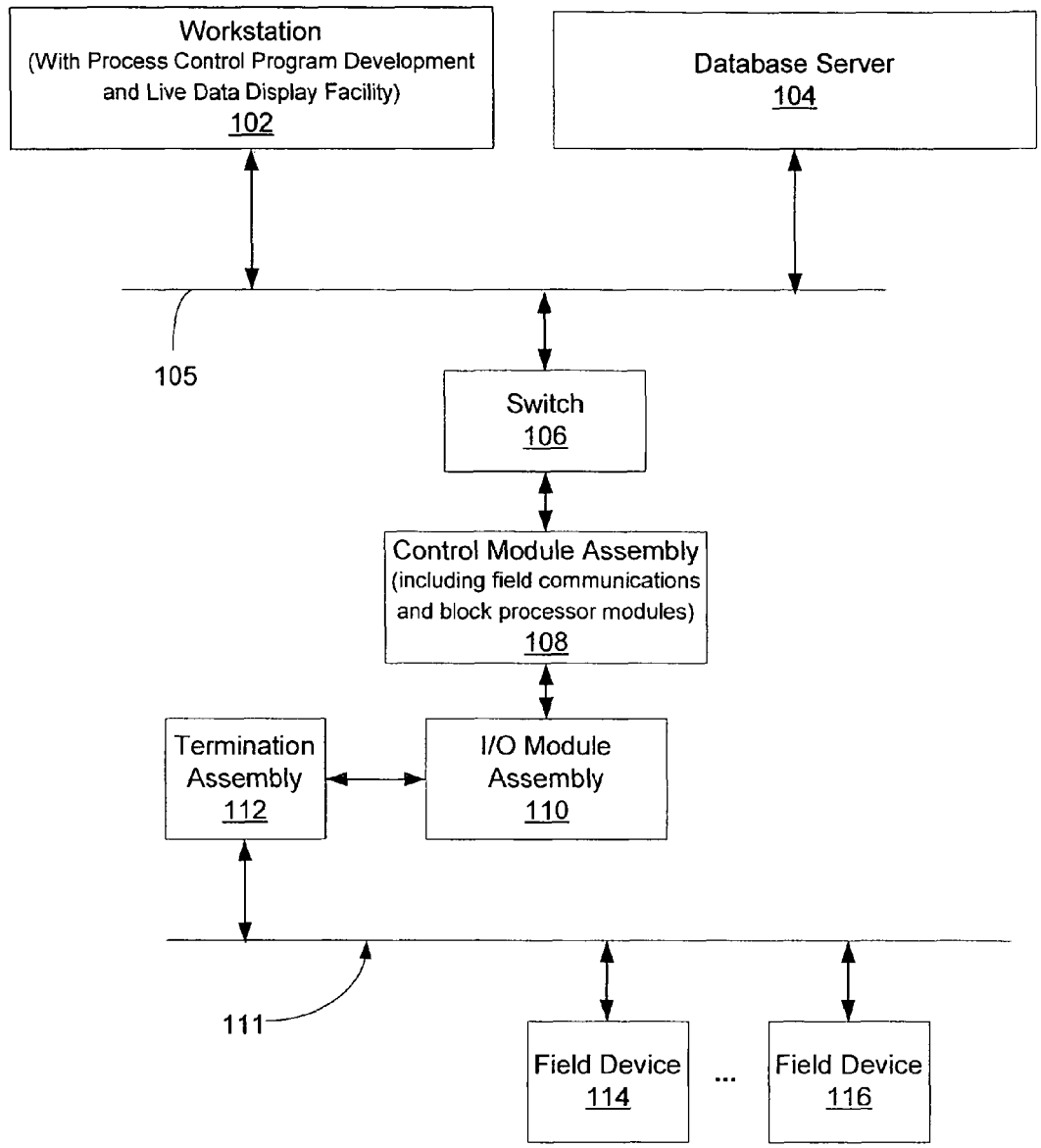
FIG. 1 is schematic network diagram showing an exemplary control strategy development and execution environment comprising both a control network and an application/supervisory network suitable for carrying out an embodiment of the present invention.

A graphical user interface-based editor facility for defining control programs (e.g., control strategies described herein below) for processes is described herein below by reference to figures illustratively depicting an exemplary embodiment of the invention. In accordance with the illustrative embodiment, the editor facility provides graphical user interface-driven functionality including, among other things: supporting a set of appearance objects defining a variety of depictions for a single control object (e.g. a control block object, a control strategy object, etc.), connecting input and output attributes of control objects through graphical user interface object manipulations (e.g., drag and drop actions), establishing execution order of control objects through graphical user interface selection, designating distinct visual appearances for different types of connections, and automatically resizing attribute display elements in response to relocation of the element within a control block's appearance object display.

The illustrative examples provided herein are directed primarily to regulatory control programs. The regulatory control programs comprise, by way of example, control objects. The term "control objects" generally refers to software objects that are instantiated and executed to perform a control function. Examples of control objects include control block objects and control strategy objects (comprising multiple, connected control objects—including even child strategy objects). Such control block objects are typically executed on a cyclical basis by control processors (or other suitable processing hardware/platforms) to maintain process variables (representative of the status of a process) within specified operating ranges. However, many aspects of the exemplary editor facility are applicable to higher level (e.g., supervisory) control programs that determine/specify set points for controlled process variables. In yet other embodiments, the graphical editor functionality disclosed herein is incorporated into a discrete control program editor.

In an exemplary embodiment, multiple appearance objects associated with a same control object (e.g., control block/strategy object) template are referenced/incorporated within a data structure for the template. The associations are maintained in any object instances created from the template. The object template structure supporting associations with multiple appearance objects facilitates developing/providing sets of industry/application-specific template sets for a control program development/editing environment. Each set of industry/application-specific templates is potentially provided for a particular application/industry to accommodate particular symbol conventions associated with the particular application/industry.

A single control object, having multiple sets of corresponding appearance objects, can thus be utilized in a variety of control program environments incorporating domain-specific knowledge associated with a particular industry/application for which the control program is developed. Industry/application-specific graphical element sets facilitate more meaningful/intuitive displays of control programs. Furthermore, rather than requiring users to adapt to the conventions of control program development tools, the multiple supported appearance objects for a corresponding control object facilitates adapting the development tools to the knowledge base/conventions of a particular industry/application.

Another feature of the appearance objects that enhances the overall utility of a control program editor is an execution order designator graphical interface. The execution order designator enables a user to manually assign, via a graphical interface, an ordinal value to a control block or connected collection of control blocks (referred to herein as a child strategy) within a parent control strategy. The ordinal value specifies a relative execution order for the control block or child strategy with respect to other blocks having assigned ordinal values. The ordinal value, once assigned, is rendered on the graphical display of an appearance object.

Yet another aspect of appearance objects is the relative ease with which display elements are relocated within the display space of an appearance object. When a display element (e.g., an input/output attribute) is added, removed, or moved to another portion of the appearance object, the display element is automatically re-sized and its connection points are re-oriented according to the dimensions/space limitations of the new portion of the appearance object within which the element is relocated.

The appearance objects include displayed connection points that are associated with data structures corresponding to particular input/output attributes for a graphically represented block or child strategy. Connecting a displayed control block/strategy output to one or more control block/strategy inputs is accomplished by simple GUI-based selection operations. For example, using a line/connection drawing tool, a user initially positions a pointer over an output attribute point/handle displayed on a first control block and selects the particular output. Thereafter, the user repositions the pointer over an input attribute handle on a control block and selects the input to complete the designation of a connection (data transmission path) between the selected output and input attributes. Data structures associated with the control program (e.g., control strategy object) are updated according to the graphically displayed connection. Furthermore, the graphical depictions of the connections between control block attributes are assigned user-configurable display attributes that visually indicate the nature of the connection. By way of example, the color of a line can reflect the data source, the data destination, the type of data passed between two connected I/O attributes (e.g., Boolean, integer, real, string, etc.).

In an exemplary embodiment, the control objects of a defined control program (e.g., a control strategy) are assigned to particular execution groups (referred to as compounds) which define a particular control processor upon which the control objects are executed in a runtime control environment. After deployment, and during runtime, process variable values corresponding to displayed attributes of the graphically edited control program are provided to the graphical editor of the control objects to facilitate displaying and setting values associated with live process control data sources. The live data values are displayed proximate to corresponding attributes on rendered appearance objects associated with the deployed control objects. In a particular embodiment the current values for the attributes are displayed adjacent a display element for the particular attributes. Thus, the appearance objects are used to provide a graphical representation of control object attribute values in a runtime environment to monitor the current values of particular watched control program I/O attributes.

Before, describing a control program editor facility embodying the present invention, an exemplary process control network environment/facility is briefly described. The present invention is potentially incorporated in a variety of process control facility arrangements, and other physical process control arrangements will be known to those skilled in the art in view of the disclosure contained herein. Turning to FIG. 1, an exemplary simple process control system arrangement/environment is depicted wherein an exemplary control program editor facility operates to create executable process control programs at a regulatory process control level. A workstation 102 (e.g., a FOXBORO Application Workstation model AW70P, by Invensys Systems, Inc.), comprising graphical control program and appearance object editors, provides a graphical control program design/development environment for creating new control programs and modifying existing programs. The control programs are thereafter deployed to, and executed upon, regulatory control processors to carry out any of a variety of process control tasks through the coordinated operation of a set of associated field devices (e.g., process variable sensors, valves, positioners, etc.) in a control environment.

The workstation 102 comprises any of a variety of hardware/operating system platforms. For example, the workstation 102 comprises, in various preferred and alternative embodiments of the invention, a personal computer potentially running any of a variety of operating systems such as: Microsoft Windows XP, Unix, Linux, Solaris, Mac OS-X, etc.

The workstation 102, by way of example, executes a live data display application. The live data display application extracts runtime data values associated with deployed control programs from a runtime data source (e.g., a runtime database maintained by a control module assembly 108). The extracted data values are rendered upon a graphical display created from previously defined appearance objects and their associated process variable attributes. Exemplary embodiments of the control program editor and live data display applications are described in detail herein below. The database server 104 maintains process control program elements (e.g., object templates and instances) associated with control program development tools and defined process control programs (also referred to herein as strategies). The database server 104 thus operates as a centralized repository of development information utilized by a plurality of workstations (not shown), such as workstation 102, having communicative access to the database server 104.

In the illustrative example, the workstation 102 is connected via an Ethernet interface/wiring to an Ethernet switch 106 via a network link 105. Alternatively, a redundant mesh network provides a communicative path between workstations, database servers, and the switch 106. The Ethernet switch 106 can be any of a variety of commercially available switches. By way of example the Ethernet switch 106 is one provided, for example, by Allied Telesyn (e.g., model AT-8088/MT). While not specifically depicted in FIG. 1, additional nodes, comprising workstations, servers and other elements (e.g., high level control module assemblies) of a supervisory portion of the control system are potentially connected to the switch 106. Furthermore, additional switches are connected to form a switched network.

The switch 106, and potentially other non-depicted switches, is also communicatively coupled to a control module assembly 108. The control module assembly 108 comprises one or more control modules (also referred to as control processors) that execute control programs driven by process sensor data values and render output values to devices (e.g., valves, motors, etc.) controlling a plant process. An illustrative example of such a control module is a FOXBORO CP model FCP270, by Invensys Systems, Inc. In other embodiments, process control functionality is carried out in any of a variety of control modules—even by control programs incorporated into the workstations, intelligent transmitters, or virtually any communicatively coupled device capable of executing control programs, loops, scripts, etc.

In an embodiment where the control module assembly 108 is the FOXBORO FCP270, workload is divided, within the FCP270, between controlling data communications and executing control programs (blocks). The FCP270 processes data received from an I/O module assembly 110 in parallel using the two distinct hardware modules—a block processor module and a field communications module. The block processor module repeatedly executes control programs, created by the process control program development facility residing on the workstation 102, according to a relatively long block processing cycle period (e.g., 100 ms). The output values of the control programs executed within the block processor module are driven by process data received by the control module assembly 108 from the I/O module assembly 110. The I/O module assembly 110 comprises, by way of example, INVENSYS FBM207 and/or FBM217 fieldbus modules that pass digital input values to the control module assembly 108. Both the process data and the output values calculated by the control programs on the control module assembly 108 are accessed, either directly or indirectly, by the live data display facility executing on the workstation 102. In an exemplary embodiment, the process data provided by the control module assembly 108 is displayed alongside corresponding attribute identifications provided by appearance objects associated with a presently displayed graphical representation of a control program—or portion thereof.

With regard to the above-mentioned data communications task carried out by the control module assembly 108, in the illustrative example the field communications module within the FCP270 receives data from the I/O module assembly 110. The received data is passed to both the above-mentioned block processor module (within the control module assembly 108) and to process data subscribers (e.g., data access servers, data acquisition services and the live data display application running on the workstation 102, etc.) according to an appropriate network communication protocol (e.g., TCP/IP) via the network link 105. The protocols/mechanisms used to provide data to various subscribers varies in accordance with particular embodiments of the invention.

With continued reference to FIG. 1, the I/O module assembly 110, alternatively referred to as a field bus module (FBM), is communicatively coupled to the control module assembly 108. Communications protocols utilized for carrying out communications between the I/O module assembly 110 and control module assembly 108 are potentially any one of a variety of proprietary/non-proprietary communications protocols. In one embodiment, the digital data communications between the control module assembly 108 and I/O module assembly 110 are carried out via a 2 MBit HDLC communication protocol. While only a single I/O module assembly 110 is depicted in the illustrative example, control systems embodying the present invention often comprise many I/O module assemblies communicating with each control module assembly 108.

I/O module assemblies, in general, incorporate one or more of a variety of specialized interfaces for communicating directly and/or indirectly to a variety of device types, including sensors/actuators embodying particular communications protocols, located at distributed locations in a plant. In the illustrative example, the I/O module assembly 110 comprises a Foundation Fieldbus I/O module (e.g., an Invensys field bus module model FBM228) that supports communications between the control module assembly 108 and field devices coupled to a Foundation Fieldbus network 111. In the illustrative embodiment, a set of representative intelligent field devices 114 and 116, containing multiple application-dependent configurable parameters, are connected to the Foundation Fieldbus network 111. The field devices 114 and 116 operate at the lowest level of a control system to measure (transmitters) and control (positioners, motor switches, etc.) plant activity. A termination assembly 112 communicatively couples the I/O module assembly 110 to the field devices 114 and 116. The termination assembly 112 provides power and power conditioning to the extent needed by the field devices 114 and 116 on the network 111.

Figure 2:
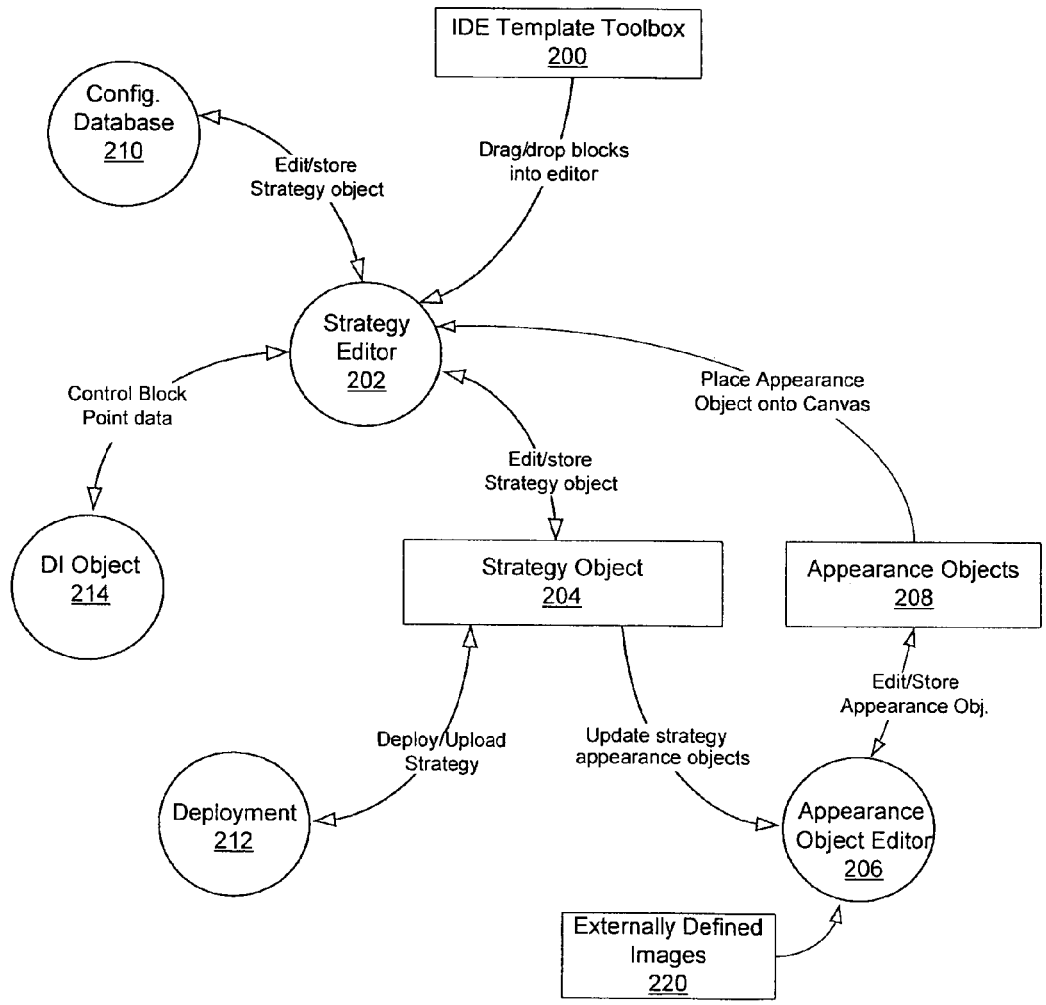
FIG. 2 is a schematic diagram of a strategy editor facility executing on a workstation node communicatively coupled to a control processor that executes control programs developed through the strategy editor facility.

Having described an exemplary network environment within which a control program editor embodying the present invention is potentially incorporated, attention is directed to FIG. 2 that depicts an exemplary set of interfaces/components associated with the control program editor facility. The interaction of software components (represented by circles) and data/objects (represented by rectangles) for the editor facility is depicted with reference to a strategy object 204 containing one or more control objects (e.g., control block and child strategy objects) and associated appearance objects 208. The illustrative components of the editor facility, residing on the workstation 102, provide/support the following: a graphical user interface-based control program (e.g., control strategy) editor, an editor of graphical depictions associated with control objects/templates from which control programs are created, and a live data display mechanism for displaying current values of control object I/O attributes corresponding to a control program defined and displayed via the control program editor.

The control program editor facility depicted in FIG. 2 includes an independent design environment (IDE) template toolbox 200 including pre-programmed control object templates from which a user, via a strategy editor 202, instantiates control objects contained within the strategy object 204, creates child control strategy templates/objects (comprising a set of connected control object templates), and derives child control object templates from previously defined control object templates. The control object templates are, for example, graphically represented in an expanding/contracting tree structure rendered within a template toolbox frame area of a graphical user interface supported by the strategy editor 202 (see, FIG. 10 described herein below). Other ways of presenting the available templates of the template toolbox 200, including a set of user-selectable application-specific pallets including a set of bitmap representations of selectable control object templates, will be known to those skilled in the art in view of the disclosed exemplary embodiment described herein.

The items represented in the template toolbox frame area of the strategy editor 202's user interface need not be control objects corresponding to individual control blocks. In an embodiment of the invention, a developer creates compositions of connected control object templates (corresponding to connected control blocks). The resulting intermediate-sized compositions of control object templates, referred to as "child strategies" herein, are added to the template toolbox 200 and presented as templates (e.g., as named template nodes on the hierarchical tree of control program object templates) within the template toolbox frame area of the user interface of the strategy editor 202. A user defines a control program comprising interconnected (through I/O attributes) control block/child strategy objects. The control program (also referred to as a control strategy herein) is maintained in a control strategy object data structure that includes a set of control objects defined by a user via the strategy editor 202 and appearance object editor 206.

In an exemplary embodiment, a set of control object templates are provided by the template toolbox 200 that are applicable to a variety of technological areas/applications. However, rather than supporting only a single graphical view for each one of the set of control object templates/instances, a user-extensible set of area/application-specific (e.g., power generation, oil refining, chemical production, etc.) graphical views/depictions are supported for individual ones of the set of control object templates/instances. Such area/application-specific graphical views/depictions for particular control objects are implemented by creating, for the particular control objects, associations with corresponding extensible sets of graphical faceplate definitions. Thus, a single control object can be represented by the strategy editor 202 graphical interface in multiple ways based, for example, upon the particular type of process within which the control object will ultimately execute. In an illustrative embodiment, the appearance objects 208 provide the graphical faceplate definitions for the control objects contained within the strategy object 204.

As indicated in FIG. 2, the appearance objects 208, edited via the appearance object editor facility 206, exist as separate entities from associated control block/child strategy objects contained within the strategy object 204. The strategy editor 202 imports the appearance objects 208 on an as-needed basis, such as when a user deposits a control object onto a control program canvas (see, FIG. 10) for the strategy object 204 displayed within a graphical user interface of the editor 202. Appearance object templates, from which the appearance objects 208 are created, are specified by an entry within the control object template from which the strategy object 204 is created. The appearance objects 208 incorporate a well-defined interface for supporting functions associated with graphically representing the strategy object 204 and its exposed attributes/properties in a control program development/configuration environment supported by the strategy editor 202.

Thus, as explained above, the visual/graphical display aspect of a control program control block/child strategy object is provided/supported in a control strategy development/configuration environment by a separately defined component, referred to herein as an appearance object. Furthermore, each control block/child strategy object is associated with an extensible set of user specifiable graphical definitions. Each graphical definition, including specified input/output attributes, is maintained as a distinct appearance object associated with a control object. Only one appearance object, of a set of associated appearance objects, can be designated to provide a graphical representation for a control object at any particular point in time. However, any one of the appearance objects associated with the control object can be designated by a user to render a desired one of the multiple available graphical representations supported by the appearance objects.

The appearance object editor 206 performs tasks relating to defining the visual/graphical display aspects of a control program. With regard to control blocks and strategies displayed on a canvas displayed by the strategy editor 202, as input and output attributes (e.g., strategy input/output declarations) are modified via the strategy editor 202, the changes are passed to the appearance object editor 206. The appearance object editor 206, in turn, updates the associated appearance object for the control object to incorporate the changes. In an exemplary generalized format for the arrangement of information presented by an appearance object for a control strategy (see, FIGS. 8a and 8b), the appearance object editor 206 places added input declarations on the left side of an appearance object for the strategy. Added output declarations are positioned on the right side of the appearance object. Thus, in accordance with another aspect of the disclosed editor facility, an automated mechanism, in response to changes to inputs/outputs on a control object, updates a set of inputs and outputs on the control object's associated appearance objects. Thus, a user is not required to take any action to synchronize changes made to input/output attributes of a control object (e.g., control strategy) via the strategy editor 202 with an associated set of appearance objects.

The control program editor facility includes a number of additional interfaces to a variety of components of a control environment. The strategy editor 202 interfaces with a configuration database 210 that maintains an archive of control programs and portions thereof—including control objects and associated sets of appearance objects. The strategy editor 202 stores defined control programs, child strategies, and even individual control objects for later retrieval/editing.

The strategy editor 202 interfaces with a deployment process 212. The deployment process 212 is invoked by a user, through the strategy editor 202, to deploy an entire control program comprising many control objects. The deployment process 212 is also used to deploy individual control block/child strategies that comprise a portion of a deployed control program. In an embodiment of the invention, a modified, previously deployed control program is updated by the deployment process 212 on an as-needed basis. In particular, a deployment process scans the set of objects that make up the revised control program, and the deployment service 212 only deploys blocks and block attributes that have been modified since the previous deployment.

Furthermore, the strategy editor 202 interface to the deployment process 212 supports an upload operation in which a user may perform a "blind" upload. During a blind upload, all the configurable attribute values within a control block or child strategy are uploaded from the runtime database in the control module assembly 108, and stored within the configuration database 210. A smart upload operation is supported wherein runtime values with database values are presented to a user. The user decides, based upon a comparison of two values for a same attribute, whether or not to upload one or more runtime values into the configuration database 210, or redeploy the block(s), thus sending attribute values from the database 210 to the runtime system via the deployment service 212. It is noted that the configuration database 210 corresponds to the database server 104 in FIG. 1.

An exemplary control system includes device integration objects that operate as gateways/channels to live data associated with the control system. The strategy editor 202 interfaces with a device integration (DI) object 214 to receive and display live data values extracted from the runtime version of the control strategy object 204. Data for each attribute requested by the strategy editor 202 passes from the DI object 214 to the strategy editor 202. The strategy editor 202 thereafter displays the live data at an appropriate location within a canvas displaying the appearance objects 208 for the control objects contained by the strategy object 204. Conversely, the strategy editor 202 passes values (e.g., new set points, alarm limits, etc.) to a deployed version of the strategy object 204 via the DI object 214.

The control program editor facility represented in FIG. 2 also includes an interface to the appearance object editor 206 for importing externally defined images 220. Images that are generated externally from the appearance object editor 206 are inserted into an appearance object, either via cut/copy and paste, or by an Insert Bitmap operation.

Both the strategy editor 202 and the appearance object editor 206 are described further herein below.

An exemplary set of object attributes supported in the strategy object 204 are summarized in FIG. 3a. The attributes on the strategy object include an AppearanceObject attribute 300. The AppearanceObject attribute 300 contains the graphic definition (e.g., "blob") describing all of the appearance objects currently available for the strategy object 204. One of the appearance objects is designated as the "default" appearance object. The graphical element defined by the default appearance object for the strategy object 204 is rendered whenever the strategy object 204 is initially placed with a displayed strategy. At any time during the configuration process, the user can select a different appearance object to be rendered for strategy object 204, presuming the user has previously constructed them.

A BlockData attribute 302 contains a serialized collection of blocks contained within the strategy object 204.

A DeclarationData attribute 304 contains a serialized collection of I/O declarations that belong to the strategy object 204.

Figure 10A:
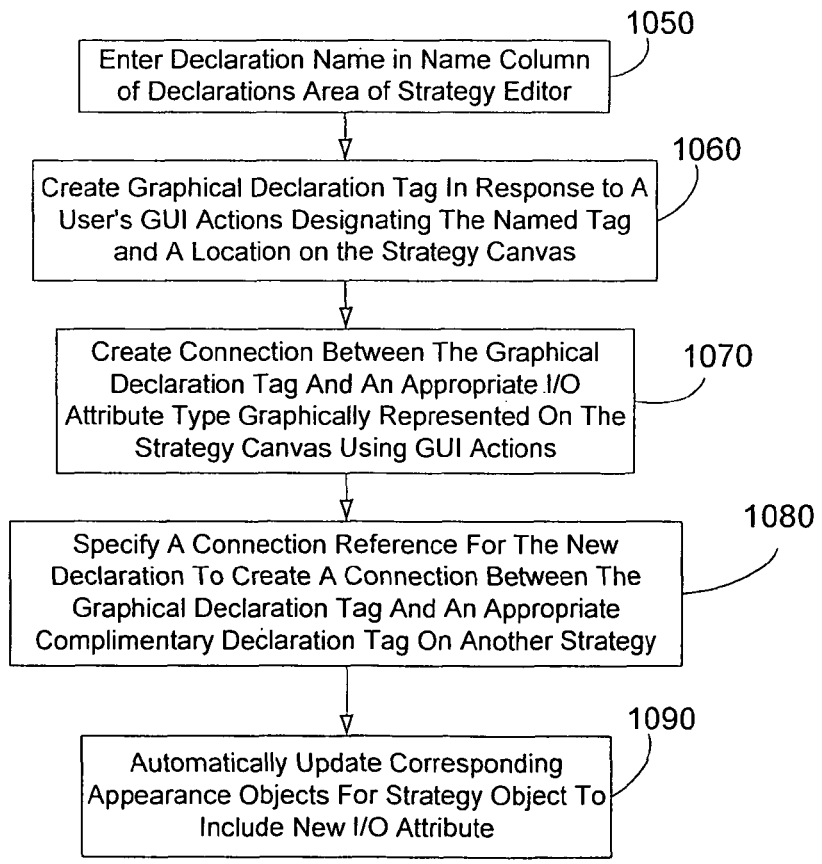
FIG. 10a is a flowchart summarizing steps for creating a declaration connection via GUI-based actions on a strategy editor canvas.
Figure 10:
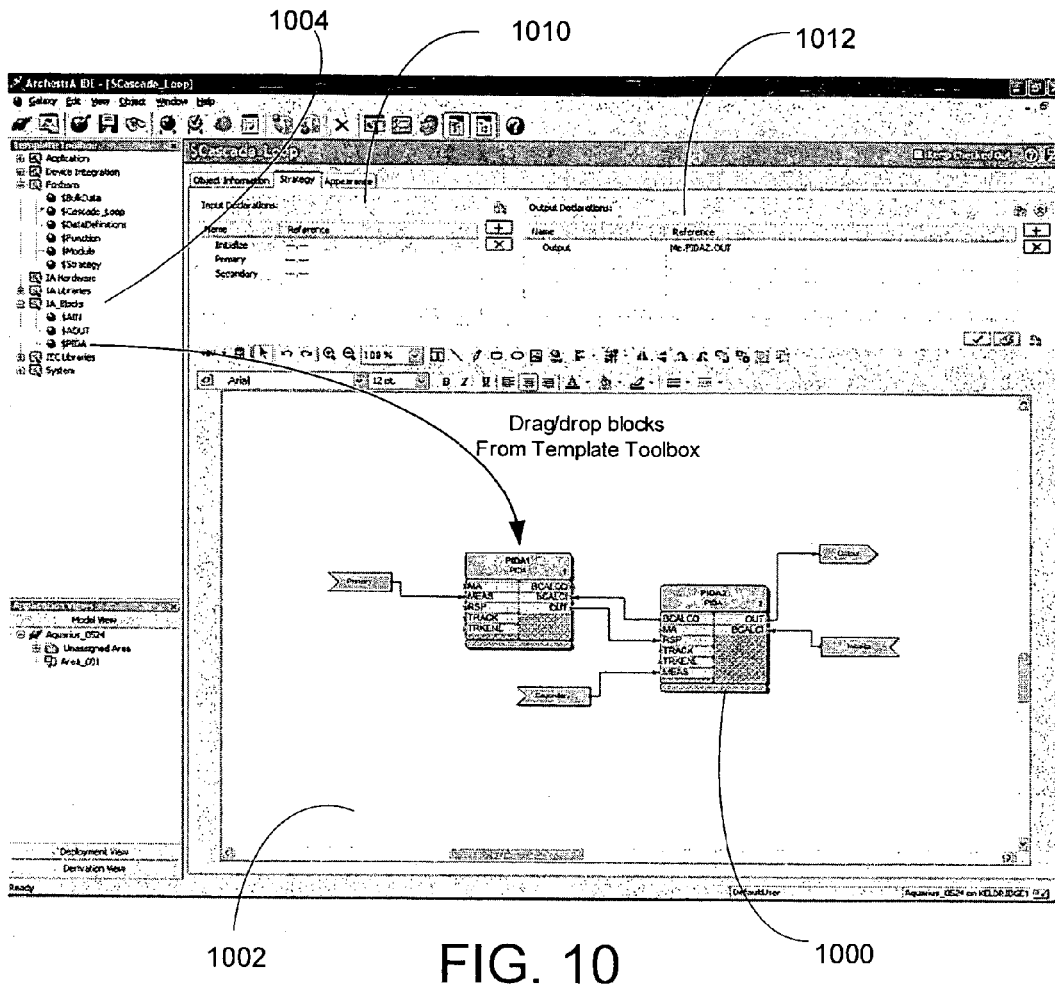
FIG. 10 illustratively depicts an exemplary graphical user interface for a strategy editor.

A Diagram attribute 306 contains a graphic definition ("blob") describing the full-sized graphical display for the control strategy 204, rendered within the canvas area of the graphical interface supported by the strategy editor 202 (see, FIG. 10).

An ExecutionOrder attribute 308 contains a list of all the block and child strategy objects in execution order within the strategy. By way of example, the data contained in this attribute is specified using XML in the form:

```
<ExecutionOrder>
    <Block Name = "AIN2" Type = "AIN"/>
    <Block Name = "AOUT4" Type = "AOUT"/>
    <Block Name = "MyStrategy" Type = "Strategy"/>
</ExecutionOrder>
```

An FBMChannels attribute 310 is an array wherein each element of the array corresponds to a I/O channel on the FBM. The FBMChannels attribute 410 is used during I/O assignment expedite navigation to I/O blocks connected to the FBM.

An IOBlocks attribute 314 is an array element wherein each entry maps to a corresponding entry in the FBMChannels array. The array elements contain the block reference to which a particular FBM channel is connected.

A LinkedToTemplate attribute 316 is a flag indicating whether or not the strategy object 204 is linked to its defining template. The LinkedToTemplate attribute 414 allows a user to break a link between a strategy and its defining template under certain circumstances (e.g., when adding or removing blocks or renaming declarations, thereby modifying the intended control scheme or logic of the control strategy).

A ModifiedOutsideEditor attribute 318 is set to signify the appearance objects and positional information for blocks and child strategies when initially loading the canvas of the strategy editor 202. The ModifiedOutsideEditor attribute 416 contains an XML data stream in the form:

```
<UpdateAction type = "bulkgen">
    <UpdateBlockname = "AIN2" appname = "AppObject_1" X = "5.0"
    Y =
    "7.0"/>
    <UpdateBlock name = "PID3" appname = "SAMA_1" X = "5.0"
    Y =
    "7.0"/>
</UpdateAction>
```

The "appname" XML property allows a user to specify which appearance object should be used to render an identified block and/or child strategy object within the graphical interface allocated for the strategy object 204, when the control block/child strategy objects have more than one associated appearance objects.

The "X" and "Y" XML properties allow the user to specify where the block or child strategy object's appearance object is supposed to appear on the canvas. If "X" and "Y" aren't specified, the default positional algorithm used by the strategy editor 202 will place each successive block or child strategy. Initially empty, the contents of the "UpdateAction" XML structure is written to by a bulk generation process. The name of the appearance object(s) and positional information is supplied by a user within data contained in a bulk data object. The contents of the bulk data object are cleared when the strategy object 204 is first opened within the strategy editor 202 following bulk generation.

A Period attribute 320 specifies a default execution period applied to all blocks when initially added to the strategy.

A Phase attribute 322 specifies a default phase (within a multi-phased execution cycle for control programs) applied to all block and strategy objects when initially added to the strategy object 204.

A Prefix attribute 324 specifies a prefix that is appended to all blocks within the control strategy 204.

A GraphicsGUID attribute 326 contains a GUID which matches a shape on a graphical diagram. The GraphicsGUID attribute 326 is in the form: {8F4871FA-5915-47FE-BB2C-862E1B4E99CD}. The GUID value is used to link an IgObject in the configuration database 210 to the graphics shape, and is only populated when a strategy template is dragged/dropped onto another containing strategy.

The above-described data content is included with control strategy objects. However, every control object (e.g., control block object, control strategy object) that can be associated with multiple appearance objects includes several data structures utilized within the appearance object editor 206 and/or other processes such as the strategy editor 202 that closely interoperate with the appearance object editor 206 to support potentially multiple appearance objects associated with the control object/template. These data structures are identified in FIG. 3b and described herein below. An AppearanceObject attribute 350 (corresponding to AppearanceObject 300) stores an appearance object graphics definition "blob" defining all the graphics display elements associated with the identified control object (including the graphics display elements for all associated appearance objects). By way of example, the AppearanceObject attribute 500 is stored as VISIO binary, and contains the entire contents of the Appearance Object Editor.

An AppearanceObjectsList primitive attribute 352 stores an appearance objects list. The AppearanceObjectsList attribute 352 facilitates keeping track of all of the appearance objects that have been defined for a particular block or strategy object template. There is one entry in the list for each page control defined within the appearance object editor. The first appearance object identified in the appearance object list is treated as the "preferred" (or default) appearance object that is used when initially rendering the control object on a control strategy canvas.

An XmlDefaultAppearance attribute 354 stores a listing of attributes that appear on a default appearance object. The XmlDefaultAppearance attribute 354 contains data specified using XML in the form:

```
<DefaultAppearance>
    <Inputs>
        <Attribute Name="BCALCI" Order="1"\>
        <Attribute Name="MA" Order="2"\>
        etc...
    </Inputs>
    <Outputs>
        <Attribute Name="BCALCO" Order="1"\>
        <Attribute Name="OUT" Order="2"\>
        etc...
    </Outputs>
    <Information>
    </Information>
</DefaultAppearance>
```

To enhance performance, an XMLDescription attribute 356 specifies a list of control object attributes. The XMLDescription attribute 356 comprises a series of comma-separated values, each value containing the following:

- Control attribute name (e.g., "ACHNG") followed by a pound sign ('#')
- A string containing the sequence:
    - Data type
        - 'C' = character
        - 'i' = Integer
        - 'R' = Real
        - 'B' = Bool
        - 'D' = Long Real
        - 'L' = Long Int
        - 'i' = Integer
        - 'P' = Packed Bool
        - 'A' = Packed Long
    - Connection type
        - 'N' = None
        - 'F' = Source
        - 'T' = Source and Sink
        - 'D' = Data address source and sink
    - Configurable
        - 'Y' = Yes
        - 'N' = No
    - Settable
        - 'Y' = Yes
        - 'N' = No
    - Data store
        - 'Y' = Yes
        - 'N' = No Finally, each control object that can be associated with an appearance object includes graphics (e.g., VISIO) stencils 358, delivered as part of each block or strategy object template. The stencils are copied to required locations when an object is first opened. The Appearance Object Editor makes no modifications to the format.

The component interfaces supported by the strategy editor 202 and strategy object 204 to carry out the above-described strategy editor 202's functionality are now described with reference to FIG. 4. A CreateUniqueBlockName function 400 creates a unique block object name within the strategy object 204. The input comprises a name of a block template from which a new block is to be created. Thereafter, a unique block name is created within the strategy object 204 using the block template type as the base for the new name. For example, for an AIN block name, the root for the new block name is AIN. The actual name is, for example, AIN_001 (i.e., the system maintains a list of current AIN block object names and appends an appropriate numerical extension. The new block name (e.g., AIN_001) is returned to the caller.

A CreateBlock function 402 creates a new block object instance. The input comprises the name of the block to be created and the block template from which the block object instance is to be created. The CreateBlock function 402 output is a new block object of the given name and type.

A RemoveBlock function 404 removes an identified block object from the strategy object 204. The input comprises the contained name of the block object to be removed and a flag indicating whether execution order needs to be updated in other remaining blocks in the strategy object 204.

A RenameBlock function 406 assigns a new tagname or contained name for a block object. The input comprises the old block object name, the new name, and whether the name to be changes is the tagname or the contained name.

In the illustrative embodiment, declarations are used to specify an input or output of a control strategy object and thus provide a point of connection to other control strategy inputs/outputs. A CreateUniqueDeclarationName function 408 creates a unique declaration name within the strategy object 204. A CreateDeclaration function 410 creates a declaration instance. The input comprises a declaration name and type (input or output). The CreateDeclaration function 410 returns a declaration object of the indicated type. A RemoveDeclaration function 414 removes a named declaration from the control strategy 204. A RenameDeclaration function 416 assigns a new name to a declaration. The input comprises the old and new declaration name.

In the illustrative embodiment, child strategy objects comprise collections of connected control objects. A CreateUniqueStrategyName function 418 creates a unique child strategy name within the strategy object 204 container. A CreateChildStrategy function 420 creates a new child strategy object. The input comprises a name for the new child strategy object to be created and a flag indicating whether contained objects should be created. The CreateChildStrategy function 420 returns a child strategy object. A RemoveChildStrategy function 422 removes a named child strategy from the control strategy object 204. A RenameChildStrategy function 424 assigns a new tagname or contained name to a child strategy object. The input comprises the old and new names as well as whether the changed name is a contained name or a tagname. If the contained name is changed, then all sibling strategy object input declaration references are updated to include the new name assigned to the child strategy object.

A set of functions address the I/O assignments between fieldbus module channels and corresponding control block objects. An AddBlockIOAssignment function 426 adds an I/O assignment between a fieldbus module channel and a control block object. The input comprises the name of an I/O block object and a fieldbus module channel. A RemoveBlockIOAssignments function 428 removes all I/O assignments between a fieldbus module and a control block object. The input comprises the contained name of the control block object.

A Compile function 430 performs a bulk compilation of all sequence and programmable logic blocks contained in a strategy object. An UpdatedFromParent function 432 automatically updates a control strategy when the control strategy's parent template changes. The following are updated in the control strategy during the operation: added/renamed/deleted block objects, added/renamed/deleted declarations, added child strategies, updated execution order. A DetachFromParent function 434 detaches a control strategy object (e.g., strategy object 204) from its parent template. Detaching a control strategy object from its parent template prevents further changes made in the parent template from propagating down to the derived control strategy.

A set of interface functions supported by the strategy object 204 enable access to properties associated with declarations. A Name property 436 retrieves or sets a declaration name. A GUID property 438 retrieves or sets a declaration GUID. A Reference 440 retrieves or sets a declaration's reference string. A Type property 442 retrieves or sets the type (input/output) of the declaration. A Locked property 444 retrieves or sets the lock status of the declaration (e.g., unlocked, lock in me, locked in parent). An UpdatedFromParent function 446 updates the declaration from a defining declaration object. A DetachFromParent function 448 detaches the declaration from its defining declaration template.

An appearance object interface enables access to appearance object properties associated with the strategy object 204. A DefaultInputAttributes property 450 retrieves or sets input declarations on the strategy object 204. A DefaultOutputAttributes property 452 retrieves or sets output declarations for the strategy object 204. An AllAttributes property 454 provides all declarations on the strategy object 204. As noted above, a single control block or strategy object can have multiple potential appearance objects. An AppearanceObject property 456 retrieves or sets the appearance object that will be associated with the strategy from a group of potentially usable appearance objects.

Appearance Object Editor 206

Having described the strategy editor 202 functionality, attention is now directed to the appearance object editor 206 and appearance objects 208. The appearance object editor 206 is, by way of example, a component object control that is launched via a generalized control program configuration application that also hosts the strategy editor 202. The appearance object editor 206 is accessed, for example, via a tab control on the strategy editor 202 graphical user interface for each control block or strategy object template.

When activated, the appearance object editor 206 first loads in any graphics stencils specified as being needed for a currently selected appearance object. The stencils are located in a block or strategy file that is imported into the configuration environment. When a template derived from one of the graphics stencil files is opened, the files are automatically copied to a proper directory on the local platform where the control program configuration application is running.

If an appearance object for a control block or child strategy object is being edited for the first time, the appearance object editor 206 loads a default appearance object for that block or strategy object template. Once the default appearance object is loaded, the appearance object editor 206 permits editing the appearance object.

Explained in detail further herein below, the appearance object editor 206 enables a user perform the following actions:

- Modify a default appearance object for a control object by resizing and/or dropping or moving attributes displayed on the default appearance object to change which attributes are displayed, and where the attributes appear.
- Create a new appearance object using standard pre-defined features. These types of appearance objects interact with the user in a very predictable manner, automatically resizing properly when attributes are added or removed during configuration.
- Create a new appearance object using non-standard features in a free form manner. These types of appearance objects are often used to represent control objects in a control program development/configuration application for a particular industry (e.g., SAMA symbols within the Power industry, etc.).
- Create multiple appearance objects for the same control block or strategy object template. A separate graphics page control is created for each appearance object defined by the user. The user names the page controls (effectively naming the appearance object) and orders the appearance objects for a same control object as desired.

During an edit session using the appearance object editor 206, a user defines a preferred appearance object, which will thereafter be the first display option the next time the appearance object editor is invoked on the block or strategy template. The preferred appearance object is also the one that is used to generate a graphical representation for an associated control object when the block or strategy template, with which the preferred appearance object associated, is selected to create a corresponding control block or strategy object via the strategy editor 202.

The "preferred" appearance object is determined as follows: first, the appearance object appearing in the first page control of the appearance object editor for a particular selected block or strategy object/template; second, the appearance object currently edited by the user, whether it be a modified pre-defined or fully customized appearance object; and third, the default Foxboro appearance object.

Having described the general functionality of the appearance object editor 206, the component interfaces supported by the appearance object editor 206 and the appearance objects 208 to carry out the above-described appearance object editor 206's functionality are now described with reference to FIG. 5. A set of administrative functions are supported by the appearance object editor 206. In the illustrative embodiment, these functions are supported by a tab page control that hosts the appearance object editor 206. An initialize method 500 receives as input an identification of an object that is invoking the initialized method. The initialize method 500 initializes the appearance object editor 206 with proper settings and thereafter calls a LoadDefaultStencils method 502.

The LoadDefaultStencils method 502 opens a default set of stencils for the appearance object editor 206. In particular the LoadDefaultStencils method 502 creates an instance of a stencil manager and then utilizes the instance to retrieve a hidden stencil entitled "Support".

A BuildDefaultAO method 504 constructs a default appearance object for an identified control object (block or strategy) template. The BuildDefaultAO method 504 input comprises an indicator of whether to preserve the width of the appearance object and whether zooming in on the graphical element is supported. The output of the BuildDefaultAO method 504 is a new appearance object instance graphically represented in the center of a designated area (e.g., current editor page) on the editor 206's display.

A CenterAO method 506 is invoked to center an appearance object in a current designated area (editor page). In addition to centering the appearance object's display element, the CenterAO method 506 returns the updated center coordinates of the appearance object.

An AddParameters method 508 adds parameters to a default appearance object for a control object. The input comprises the appearance object. The AddParameters method 508 calls a GetDefaultIOParameters method 510 and inserts the returned parameters. The AddParameters method 508 returns the default appearance object with updated input, output, and information parameters.

The GetDefaultIOParameters method 510 extracts all attribute names of input, output and information parameters for an identified control object (e.g., the contents of XMLDefaultAppearance Attribute 354) and returns them to the caller in the form of segregated and sorted lists. A first list includes the names of all the input/output parameters. The second list includes the information parameters for the control object.

A CalculateAOReadOnlyStatus method 512 determines whether an appearance object is read only. The CalculateAOReadOnlyStatus method 512 determines whether or not an appearance object is read only by first determining whether a parent of the appearance object is in read only mode, and then determining whether the AppearanceObject attribute 350 is locked, and finally checks to see if the default appearance object is being displayed.

A next set of functions associated with the appearance object editor 206 exist on a control that hosts the appearance object editor 206. An Initialize function 520 is responsible for a control containing the appearance object editor 206. The input comprises a form for a parent of the appearance object editor 206. The Initialize function 520 establishes a pointer to a manager class (a static class available to all editors), and initializes the control to receive/subscribe to events relating to the appearance object editor 206.

A DataChange method 522 processes data change events for an appearance object. The input comprises an identification of a changed item and a new value of the item. The DataChange method 522 accesses appearance objects from the appropriate attribute and updates pages within the appearance object editor based upon the changed data. A resulting new appearance object is stored in a temporary graphics (e.g., VISIO) file.

An Apply method 524 stores an appearance object. In particular, the Apply method 524 calls a serialization method on the associated control object in order to store the appearance object in persistent memory.

A Close method 526 closes the control in an orderly manner by deleting a file containing a previously opened appearance object and unsubscribing from all the events previously subscribed to during the Initialize method 520.

A next set of functions relates to the operation of the appearance object editor 206 to facilitate editing a loaded appearance object by a user. An UpdateEditorUI method 530 updates a user interface on the appearance object editor 206 based upon various events/conditions. The UpdateEditorUI method 530 updates the enabled/disabled state of all buttons on the user interface based upon conditions such as a read-only mode or a user editing an appearance object.

An UpdateUpdateAOBtnStatus method 532 enables or disables update buttons. The UpdateUpdateAOBtnStatus method 532 determines whether objects have been added to the appearance object by the user, in response the appropriate update button is enabled.

An UpdateFinishFrameStnStatus method 534 enables/disables Finish Frame buttons on the user interface of the appearance object editor 206 based upon whether any objects have been added to the appearance object.

A btnResetAO_Click method 536 is invoked when a Default button is selected. The inputs comprise event arguments and the source of the events. The btnResetAO_Click method 536 is invoked when a user has edited an appearance object and decides to re-establish the default appearance object. When selected, this method calls the BuildDefaultAO method 504.

A btnEditAO_Click method 538 is invoked when an Edit button is selected. The inputs comprise event arguments and the source of the events. The btnEditAO_Click method 538 is invoked when a user selects the Edit button in order to edit the existing appearance object. The btnEditAO_Click method 538 decides the state of an appearance object (e.g., read-only, etc.), and prepares it for editing.

A btnBuild_Click method 540 is invoked when a Create Frame button is selected. The inputs comprise event arguments and the source of the events. The btnBuild_Click method 540 is invoked when a user selects the Create Frame button to build a new appearance object using defined features. After setting the proper state, the method opens a PortAreas stencil in the editor, and erases the contents of a canvas. In the illustrative embodiment, the appearance object editor 206 supports creating new appearance objects from multiple sources.

A btnFinish_Click method 542 is invoked when a Finish Frame button is selected. The inputs comprise event arguments and the source of the events. The btnFinish_Click method 542 is invoked when the user selects the Finish Frame button in order to finish building a new appearance object. The method is responsible for realigning all the features into a single cohesive appearance object display element.

Yet another group of interface functions supported by the appearance object editor 206 are directed to page maintenance. An OnAddNewPage method 550 is invoked when a user selects Add from a page control within the appearance object editor 206. In response the OnAddNewPage method 550 invokes a method on a graphical editor (e.g., a VISIO Document.Pages.Add method) to add a new page to the page control.

An OnDeletePage method 552 is invoked when a user selects Delete from a page control within the appearance object editor 206. The OnDeletePage method 552 invokes a method on the graphical editor to remove the page from the page control within the appearance object editor.

Figure 6:
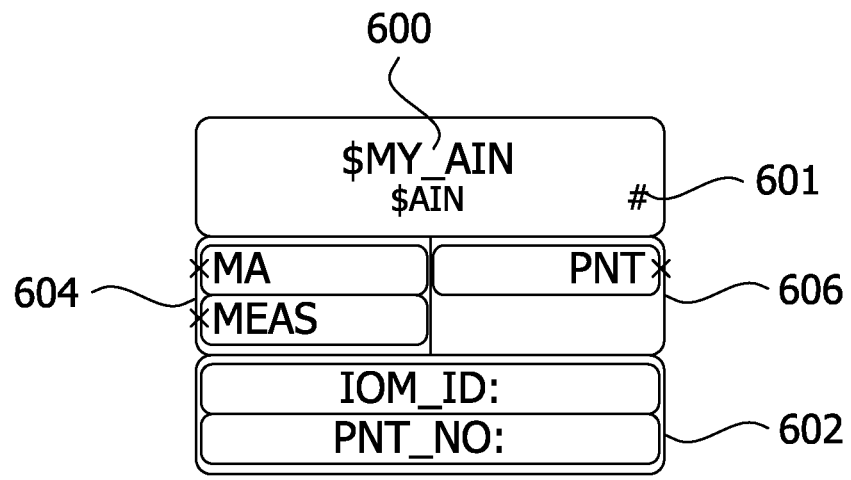
FIG. 6 depicts an illustrative example of an appearance object graphical display for a control block object template.

The present inventions involve graphically displayable faceplates for control objects for use in a configuration environment. Turning now to FIG. 6, an exemplary default appearance object graphical representation for a control block template is depicted. The illustrative embodiment of a default appearance object template includes a title area 600. The title area 600, by way of example, includes: a control block object name (e.g., MY_AIN), an object template type (e.g., AIN), and an execution order value. The example in FIG. 6 is for an object template and therefore includes a "$" character in front of both the object name and the object type. When an actual instance is created of the control object, the object template name/type are replaced by an object name/type (i.e., the "$" is removed). Furthermore an execution order is designated (described herein below), and the # placeholder in the execution order display area 601 within the title area 600 is replaced by an actual number representing the relative order of execution of the control block object in relation to other control objects in the strategy.

An information area 602 in the default appearance object graphical display identifies a set of attributes and their current values. The values, though not shown, would be displayed to the right of the identified attributes (e.g., IOM_ID, PNT_NO).

The illustrative appearance object display also includes a left port area 604 that is generally allocated to input I/O attributes and a right port area 606 that is generally allocated to output I/O attributes. The port areas 604 and 606 are reserved for connectable attributes. In an illustrative embodiments, rotation of the port areas is supported in any direction (e.g., left, right, top, bottom) to facilitate connecting an I/O attribute to another I/O attribute or variable within a control strategy. I/O connection points (marked by an x) are provided for each I/O attribute.

In the illustrative embodiment, the default appearance object graphical faceplate is arranged such that the ports area 604 and 606 are placed along-side one another and above the information area 602. However, the relative positions of the various components of the exemplary display for a control block appearance object, and the type of information provided in the displayed components, will differ in accordance with alternative embodiments. For example, in an alternative embodiment, the information area 602 is placed between the left port area 604 and the right port area 606. Furthermore, a user will be allowed to place an object's name and execution order anywhere within a graphical appearance object display for a control block object. In addition to the left port area 604 and the right port area 606, the user has the ability to apply a top port area, and a bottom port area to the appearance object, if desired.

Furthermore, as will be explained further herein below, a user may customize a default appearance by moving an input attribute to another area (e.g., from the left port area to the right port area) within the appearance object's graphical display. In the event that the destination area of a moved attribute does not fit the attribute's originally specified dimensions, the shape of the attribute display element, or alternatively the destination area, is automatically resized. The orientation of the attribute display element is rotated to fit the orientation of attributes within the destination area of the appearance object. Furthermore, any connection points in the relocated attribute display element are modified to ensure the connection point resides on an outer edge of the appearance object.

Figure 7:
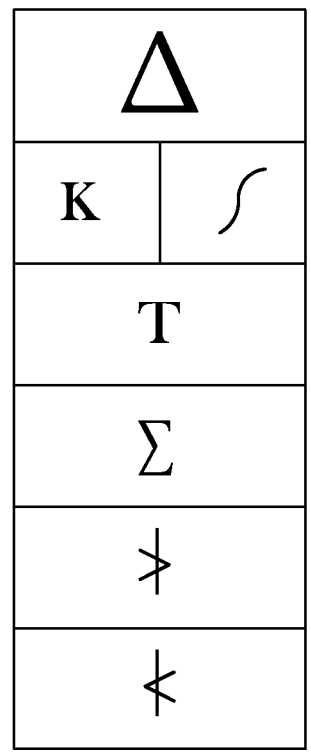
FIG. 7 depicts an illustrative example of a custom appearance object graphical display.

The exemplary embodiment of the present invention supports fully customized appearance objects. Such customized appearance objects are useful for creating a set of industry/application-specific faceplates for a set of control block/strategy object templates. Using the appearance object editor 206, a user creates a fully customized appearance object, using graphics, bitmaps, pictures, etc. An example of such a customized appearance object is provided in FIG. 7. The illustrated example depicted in FIG. 7 defines Scientific Apparatus Makers Association (SAMA) symbols for use within the power generation industry. The I/O attributes and information data values are substantially changed in character from the ones provided in the default appearance object depicted in FIG. 6. However, the symbols in FIG. 7 are readily understood by those who develop control programs for use in the electrical power generation industry. In addition to full support for bitmaps, pictures and other graphical elements, the appearance object editor 206 supports a user placing pre-defined features (e.g., a port area) described above with reference to FIG. 6 within a customized appearance object of the type depicted in FIG. 7. The editor incorporates a variety of standard graphical editor capabilities such as designating font size and appearance. Appearance objects may be resized. Appearance objects constructed from the standard building blocks such as left port area 604, right port area 606 and title area 600 can be resized horizontally, to allow display of information in an attribute that would otherwise be hidden, or partially truncated. Custom appearance objects such as the symbol in FIG. 7 may be resized in any direction.

Figure 8A:
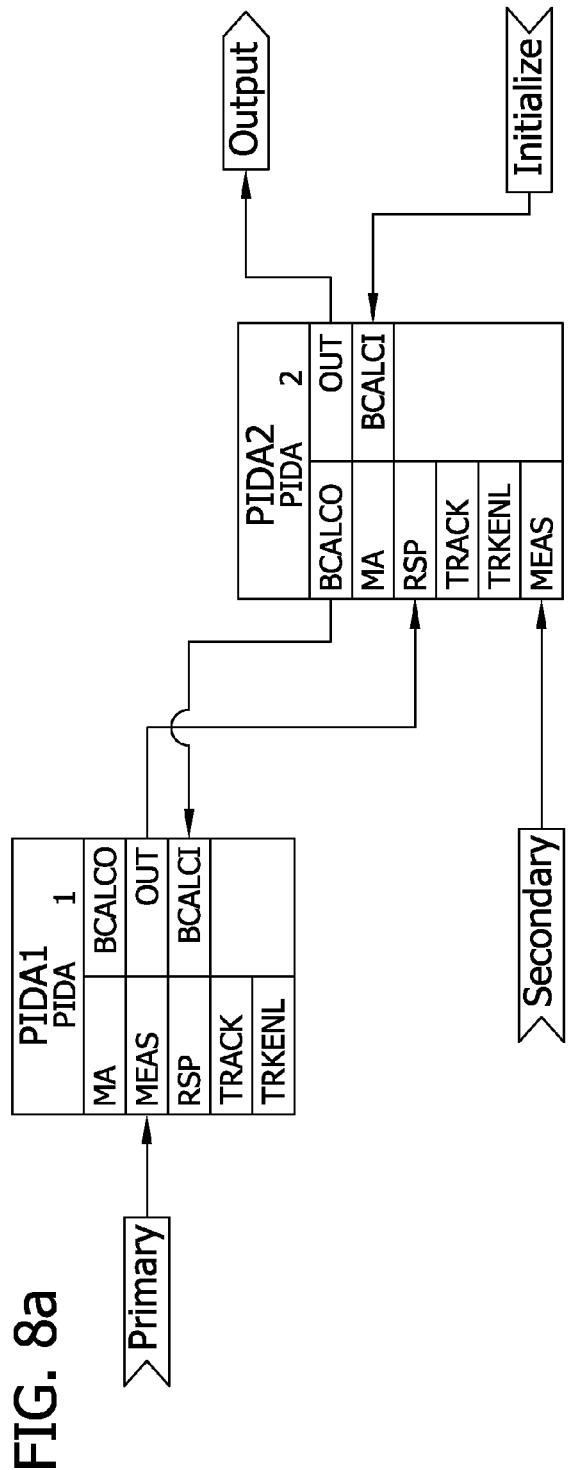
FIGS. 8a and 8b illustratively depict the graphical displays for connected blocks on a strategy editor canvas and a corresponding strategy appearance object, respectively.
Figure 8B:
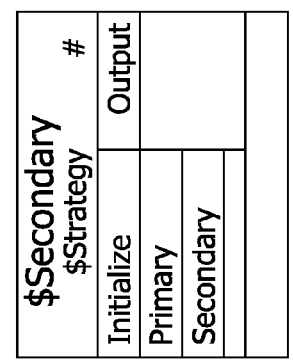

A default appearance object for a child strategy, depicted by way of example in FIGS. 8*a* and 8*b*, is similar to the appearance object for a control block. However, the input/output variables are only the I/O attributes of contained control objects (depicted FIG. 8*a*) that are declared as I/O variables (e.g., Initialize, Primary, Secondary, and Output) for the strategy.

Figure 9:
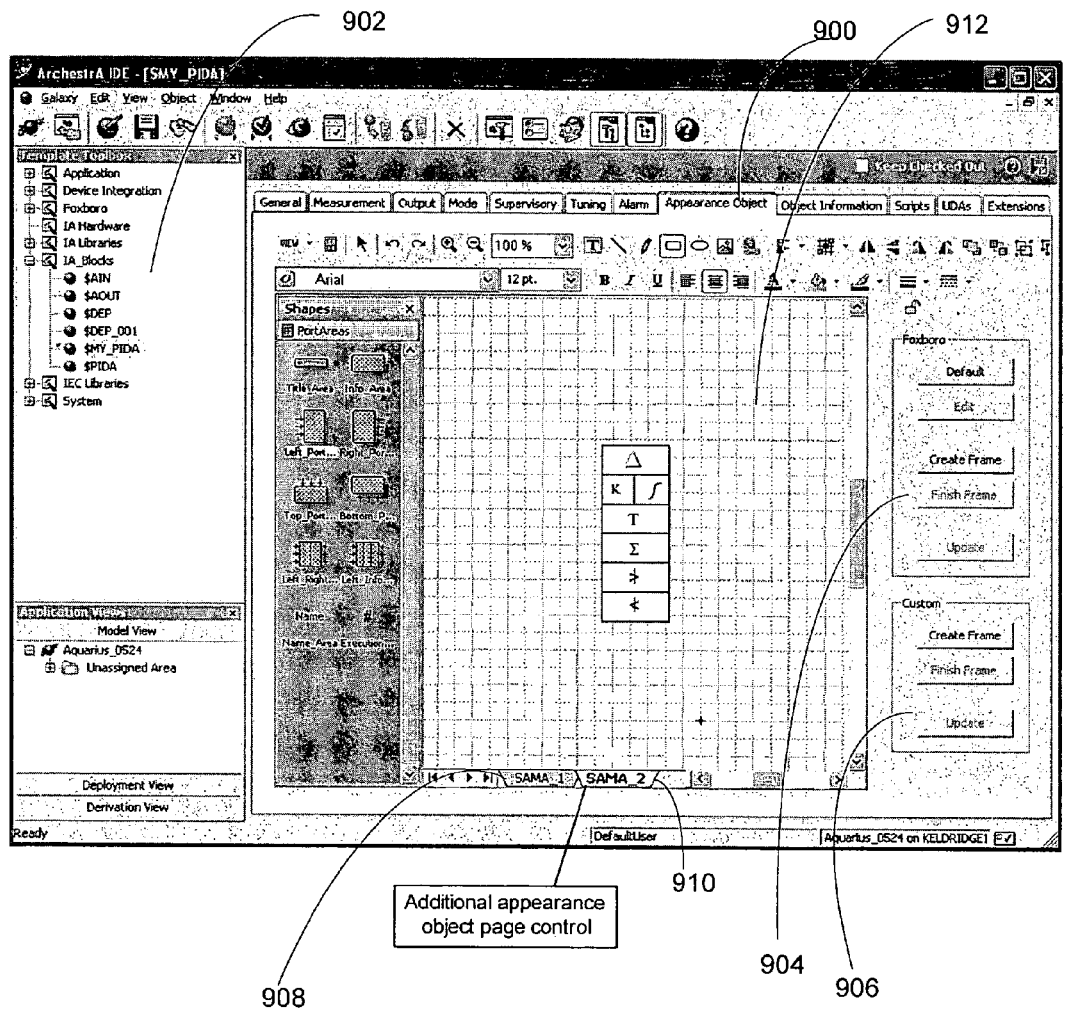
FIG. 9 illustratively depicts an exemplary graphical user interface for an appearance object editor supporting multiple appearance objects for a corresponding control object.

Turning now to FIG. 9, an exemplary user interface for the appearance object editor 206 is depicted. In the illustrative example, the appearance object editor 206 is invoked by selecting an appearance object tab 900 provided by a control program facility embodying the present invention. Alternatively, the appearance object editor 206 is invoked by selecting an open appearance object option on a context menu of a displayed control object template in the set of displayed templates provided in a control object template area 902. The appearance object editor is not available for modifying instances of control objects from within the canvas area of the graphical user interface for the strategy editor 202. The particular example includes a displayed custom appearance object including a SAMA depiction.

In the illustrative example, when the appearance object editor is invoked for a first time on a control object template, a default appearance object (see, e.g., FIG. 6) for that template is displayed in a read only mode. The default appearance object for a control block includes a pre-determined set of attributes that are designed to satisfy the majority of configuration needs for most applications. The exemplary appearance object includes a set of buttons for accessing functionality supported by the appearance object editor 206. A user selects the Edit button in a Foxboro appearance objects editor control area 904 to modify the default appearance object for a block or strategy template.

After selecting the Edit button to enter the edit mode with regard to the default appearance object, the user can perform any of a variety of display element manipulations on the displayed graphical representation of the appearance object. Such manipulations include resizing by grabbing and dragging a resize handle on a side of the appearance object graphical element. Furthermore, while in the edit mode users rotates the entire graphical representation of the appearance object by grabbing and dragging a rotation tool handle. Both such graphical manipulation tools are supported by the VISIO graphical display editor.

The appearance object editor supports a variety of manipulations to the position of attributes within an appearance object's graphical display. While in the Edit mode, a user selects individual attributes and move them up or down within the same port area by dragging and dropping the selected attributes in a new location within the same port area.

Furthermore, users are also able to move an attribute from a first area (e.g., a left port) to a second area (e.g., a right port) within an appearance object's graphical display area. In particular, users move such attributes by selecting and dragging a particular attribute from one area in the appearance object to another. The only restriction is that a non-connectable attribute can not be moved into a port area (rectangular areas within the appearance object reserved for those attributes that can connect to another).

Figure 9A:
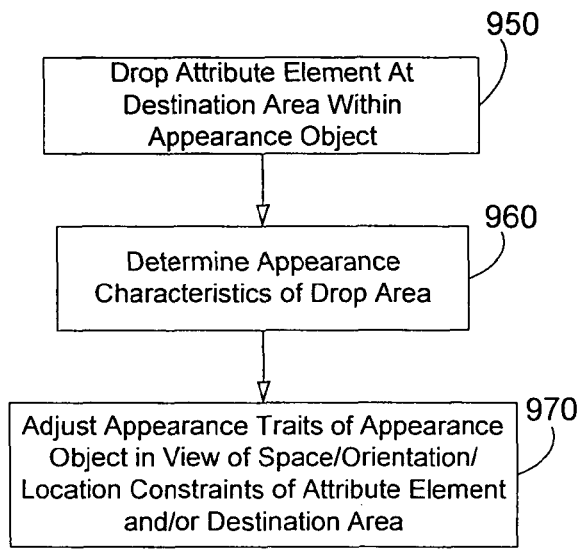
FIG. 9a is a flowchart summarizing steps for automatically resizing an attribute element when moved to another portion of an appearance object.

Turning to FIG. 9a a set of steps summarize an exemplary set of steps for automatically adjusting the appearance characteristics of a moved attribute element upon dropping within a new area within an appearance object. During step 950 a user drops an attribute element within a new area of an appearance object. Thereafter, at step 960 the appearance object editor determines the appearance characteristics of the drop area (e.g. orientation, outer edge for attribute connection point, dimensions of drop area). Thereafter, at step 970 the appearance object editor adjusts the appearance characteristics of the dropped attribute element based on the appearance characteristics associated with the target destination area. The appearance object editor also determines the type of the attribute and prevents an incompatible attribute from being added to a particular area within an appearance object.

Finally, in some instances space requirements of an attribute's display element (e.g., a long attribute name) prevent shrinking of the attribute's display element. To accommodate this case, the appearance object editor also adjusts, if necessary, both the source and the target areas, reducing the size of the area that the attribute element was dragged from, and/or enlarging the size of the area that the attribute element was dragged to accommodate the attribute display elements to a new area within the appearance object.

A user removes an attribute displayed within the appearance object's graphical display by dragging and dropping the attribute off the physical boundary defining the appearance object. A confirmation dialog is generated to verify that a user indeed intended to remove the attribute display element rather than merely move the attribute display element to another area within the appearance object.

A user adds an attribute to an appearance object by right clicking within the display area of an appearance object's graphical display area and selecting an Add Parameter option within a context menu that is thereafter generated by the appearance object editor. In response a dialog box is generated that contains a filtered list of attributes for an associated control object that can be placed on the appearance object. A user specifies a filter of Inputs, Outputs, Configurable, Settable and Data Store, or any combination of those filters, for the type of attributes to display within the dialog. Attributes that satisfy the specified filter are enumerated within the dialog box for selecting an attribute. Only attributes that are not already displayed within the appearance object appear within the enumerated list regardless of filter setting. When a connectable attribute is placed in a port area, an indicator (e.g., a yellow diamond representing the connection point) is displayed at the side of the attribute's display element. The connection points for attributes are displayed when the appearance object is selected on the appearance object editor 206.

In an embodiment of the invention, a user establishes a connection between two blocks, or a block and a strategy, by selecting a connection point from a source (output) attribute and thereafter dragging a GUI pointer to an intended sink (input) attribute. Connectable attributes placed in a non-port area shall not be accompanied by a yellow diamond, but rather appear as informational attributes only.

The Foxboro appearance objects editor control area 904 also includes a Default control button. When selected by a user the Default control reverts an appearance object back to the default appearance state—even after the appearance object has been saved.

The appearance object editor 206 enables a user to create an appearance object consisting of standard Foxboro components by selecting a Create Frame Button within the Foxboro appearance objects editor control area 904. Selecting Create Frame invokes the Port Areas (e.g., left and right ports 604 and 606) stencil, which contains elements that the user can drag/drop onto the appearance object editor canvas to make a new default appearance object. Selecting a Title Area graphical display element allows the user to create an area containing the object's name, type and execution order number. Selecting the Information Area display element enables the user to create an area that displays the name and default value (separated by a colon) of any attribute placed inside it. Selecting a Left Port element allows the user to create an area wherein connectable attributes placed inside will be aligned with the left side of the area. Selecting a Right Port element allows a user to create an area wherein connectable attributes placed inside will be aligned with the right side of the area. Selecting a Top Port element allows the user to create an area wherein connectable attributes placed inside will be aligned with the top edge of the area. Selecting a Bottom Port element allows the user to create an area wherein connectable attributes placed inside will be aligned with the bottom edge of the area. Selecting a Left-Right Port element allows the user to create two areas joined together—a left and right port area. Selecting a Left-Info-Right Port element allows the user to create three areas joined together—a left, info and right port area.

Once all elements have been dropped into the Appearance Object Editor, the user selects a Finish Frame editor control button within the Foxboro appearance objects editor control area 904 to end editing, and re-align the elements into an appearance object that can be utilized in a predefined controlled way. Once the appearance object has been initialized, the user may add, move or delete attributes as described in the previous section.

The appearance object editor 206 furthermore includes a Custom appearance objects editor control area 906 that allows a user to create a fully customized appearance object consisting of images and attributes arranged in a free form manner (i.e., a Custom appearance object) by selecting the Create Frame button option in the Custom appearance objects editor control area 906. Selecting a Create Frame button invokes the Port Areas Visio stencil, which contains elements that the user can drag/drop onto the Appearance Object Editor canvas to make a new custom appearance object, including Name and Execution Order elements. Once the Create Frame button has been selected, the user is able to place any graphic object (e.g., a bitmap) into the work area. For example, the user places a bitmap representing a PID SAMA symbol into the work area, as depicted in the canvas area of FIG. 9. By way of example, a bitmap is placed into the appearance object editor by using the Insert Image toolbar button, or by performing a copy/paste from another source of graphical images, such as VISIO. Once all graphical elements have been placed into the work area, the user selects Finish Frame to end editing, and prepare the appearance object for placement of object attributes within the appearance object.

The appearance object editor 206 supports adding attributes to a custom appearance object. In the illustrative embodiment, a user right-clicks on the appearance object and selects an Add Parameter context menu option to invoke a Select Parameters dialog. As with the Foxboro appearance objects described above, the user determines which attributes are displayed in the Select Parameters dialog by selecting a parameter filter and then drags/drops attributes from the dialog onto the custom appearance object. The added attribute can be positioned anywhere on the custom appearance object. Attributes placed on a custom appearance object are not selectable. Therefore, care must be taken to place them in the correct location when initially dropped from the Select Parameter dialog. If the added attribute is a connectable attribute, then the appearance object editor 206 places a marker (e.g., a yellow diamond) representing the connection point for the attribute at the location where the attribute was placed on the appearance object. The appearance object editor automatically determines a direction in which a connection line should be routed when a connection is made to an attribute on a custom appearance object (e.g., if the attribute is near the top of the appearance object, then the connection line will be routed through the top of the appearance, etc.)

Once all attributes have been placed on the custom appearance object, the user invokes a save operation on the appearance object editor to preserve the work and store the new appearance object within the configuration database 210.

The attributes placed on a custom appearance object are not selectable. Therefore a user must right-click on a particular appearance object and select "Delete Parameter" to remove an attribute. A dialog box appears that displays a list of attributes that are currently located on the appearance object. To delete an attribute, a user selects the desired attribute within the dialog and then confirms the selection. When an attribute is deleted from a custom appearance object, the appearance object editor 206 removes any corresponding symbol from the graphical display of the appearance object.

In an exemplary embodiment, an attribute's name is normally not visible to the user in a custom appearance object. Therefore, to display attribute names on a custom appearance object, a user right-clicks on the custom appearance object and selects Show Parameter Names from a context menu rendered by the appearance object editor 206 for the custom appearance object. When selected, Show Parameter Names causes information symbols to appear next to each attribute on the appearance object. When the cursor is placed over one of these information symbols, a tooltip appears displaying the attribute name associated with the symbol. To remove the information symbols from the custom appearance object, a user right-clicks on the appearance object and selects Hide Parameter Names from the context menu.

The appearance object editor 206 supports adding graphics to an already existing appearance object. The user places additional graphical elements into an already existing appearance object, and after updating the appearance object, the new graphical elements are fully integrated into the graphical display of the existing appearance object, and is treated as a single graphical object within the appearance object editor. To add graphical elements to a standard Foxboro default appearance object, a user enters the edit mode by selecting the Edit button within the Foxboro appearance objects editor control area 904, adding the desired graphical elements, and then selecting Update within the Foxboro appearance objects editor control area 904. Similarly, to add graphical elements to a user-defined Foxboro appearance object or a custom appearance object, the user adds the desired graphical elements and then selects the Update button within the appropriate appearance objects editor control area 904 or 906.

The appearance object editor 206 also supports renaming an appearance object. A user renames an appearance object by right-clicking on the desired appearance object page control (e.g., SAMA_1 tab 908) within the appearance object editor 206's user interface to launch a context menu. Thereafter, a user selects a Rename Appearance Object menu option. The user thereafter enters a new name for the appearance object.

As mentioned above, the graphical control program editor facility supports multiple appearance objects for a same control object template. In an exemplary embodiment, a user creates multiple appearance objects for a same control object (e.g., control block, control strategy) template within the configuration database 210 by right-clicking within the page control of any appearance object to expose a context menu. Thereafter, the user selects an Add Appearance Object menu option. In response, the appearance object editor 206 creates a new page (e.g., SAMA_2 appearance object page represented by tab 910) initialized with the default appearance object for the control block or strategy object template being edited. After an appearance object is added to a control object template, each time the appearance object editor is invoked on the control object, each of the associated appearance objects is exposed via the page control tabs (e.g., tabs 908 and 910). There are no restrictions on the type of appearance objects that users are able to create via the additional pages corresponding to multiple appearance objects for a control object template. Any added page may contain a default appearance object with attributes rearranged, a user-defined Foxboro appearance object, or a fully customized object such as a SAMA symbol.

The appearance object editor 206 supports deleting appearance objects from a control object template. By way of example, a user deletes an appearance object by right-clicking on the desired page control tab (e.g., SAMA_2 tab 910) to expose a context menu from which the user selects the Delete Appearance Object menu option.

The initial appearance object displayed for a control block or strategy object template selected from the control object template area 902 and dropped into the canvas area 912 is the appearance object occupying the first appearance object page control (e.g., SAMA_1 tab 908). A user re-orders the page controls corresponding to the multiple appearance objects for a selected control object template by selecting and dragging the desired page control tab to the desired relative position within the set of page control tabs below the canvas area 912.

In an exemplary embodiment, a user is able to dynamically select any one of a set of previously created appearance objects for a control object from within the strategy editor 202. With reference to FIG. 10, a user selects a preferred appearance object for a control object by right-clicking on a graphical representation 1000 of the currently preferred appearance object for the control object displayed in a canvas area 1002 to expose a context menu for the selected control object. Thereafter, the user selects an Appearance Object menu option to invoke an appearance object dialog, containing one page control tab for each appearance object that has been defined for the block or strategy object. By way of example, the user changes the preferred appearance object, displayed within the canvas area of the strategy editor 202's user interface, by selecting the page control (represented by a tab) corresponding to the desired appearance object and confirming the selection.

In response to the newly designated appearance object, the strategy editor 202 performs a set of automated tasks to update affected data structures and graphical user interfaces. In particular, the strategy editor updates the data structure for the selected control object to reflect the new preferred appearance object. The graphical representation for the new appearance object replaces the previous graphical representation. Furthermore, the connections are adjusted in accordance with the new appearance object's configuration. In addition to handling new positions of connections on the new appearance object, connection lines that were routed to an attribute on the replaced appearance object that are no longer visible on the new appearance object are removed from the canvas area of the strategy editor 202' graphical user interface.

Having described the user actions supported by an exemplary appearance object editor 206 attention is directed to the functional capabilities of the strategy editor 202 by reference to an exemplary graphical user interface depicted in FIG. 10. In general, the strategy editor 202 is implemented as a component within a control program of an integrated control program development application/environment. When activated, the strategy editor 202 first loads graphics (e.g., VISIO) stencils that have been specified as being needed for the process. The stencils are referenced by control object templates. When a control object template is opened, any referenced stencils are copied to the strategy editor 202 application environment. The strategy editor 202 thereafter extracts any existing related data that might have been previously stored on the control object and displays the information with the retrieved stencils on the canvas area of the strategy editor 202's graphical user interface.

In the illustrative embodiment, each control block object within a control program is an instance of a control object class created to model a particular type of control block. All instances of control block objects are serialized (stored in persistent storage) to a single attribute within the strategy object. As control objects are created by selecting them from the template toolbox 200 and designating a position for a graphical representation of the selected object within a current control program canvas graphical interface, a control object instance of the appropriate object class is created on a control program container object such as the strategy object 204.

In an exemplary embodiment, a control block object is assigned two names. A "contained name" is the name by which the control block object is referenced within its control strategy. A "tagname" is the name by which the control block object is known within a distributed process control runtime environment. The strategy editor 202 supports users assigning both the contained name and the tagname for a control object.

The control programs are deployed to particular control processors for execution in a runtime environment. One way to make such a designation is to assign the control program, or portion thereof, to a compound. The compound thereafter executes upon a particular control processor (or other appropriate control program execution hardware). A control program can be assigned directly to a compound. In the exemplary embodiment, control programs that specify a compound as a container/execution host are known as "top-level" strategy objects. Like control block objects, a top-level strategy object has two names: the contained name, or the name by which the top-level strategy object is known within its compound, and its tagname, the name by which the strategy is known outside of its compound (e.g., for designating a source or destination of I/O information provided by/to another object). Users can rename either the contained name or the tagname of a top-level strategy.

Child strategies are embedded within another strategy (either top-level or another child) by selecting a child strategy template from the template toolbox 200 displayed in a template toolbox area of a graphical user interface supported by the strategy editor 202 and thereafter depositing a graphical representation of the selected child strategy object within a canvas area on the graphical user interface. A child strategy object also has two names: the contained name, or the name by which the strategy object is known within its container, and the tagname. Users can rename either the contained name or the tagname of a child strategy object.

The strategy editor 202 automatically synchronizes a control program database with changes made to a control program (or portion thereof) graphically depicted within the strategy editor 202's canvas area. Thus, if a user deletes a control block representation on the canvas, the corresponding control block object instance and any associated connections are removed from the data structure corresponding to the contents of the canvas. If the user deletes a child strategy from the canvas, it is removed from both the canvas data structure and the configuration database 210. In this case, the child strategy is not removed from the configuration database 210 until the parent strategy is checked-in. Until that point, the user could still perform an "Undo Check Out", negating any work they had done in the strategy editor 202.

Operation of the strategy editor 202 is described herein below with reference to various supported strategy creation and configuration capabilities. A user creates a strategy template by right-clicking on any strategy template to render a context menu and thereafter selecting a New→Derived Template menu option. When created, the new strategy template appears in: a Template Toolbox area 1004 and within a tree structure, depicting the derivation relationships between templates, under an appropriate base template.

A user creates a strategy instance by right-clicking on any strategy template to invoke a context menu and thereafter selecting the New→Instance menu option. deletes a strategy instance or template from the Template Toolbox 200 by right-clicking on the object instance or template and selecting a Delete menu option.

With continued reference to FIG. 10, a set of strategy manipulation/editing functions supported by the strategy editor 202 are described hereinafter. The strategy editor 202 is invoked by selecting/opening a strategy object (e.g., strategy object 204).

A user adds control objects to a strategy by locating a desired block or strategy template within a control object template area 1004, selecting the template, and then depositing the template at a desired location on the canvas area 1002. In the illustrative embodiment in FIG. 10, two PID blocks have been created by selecting the $PIDA control block template and then depositing the resulting control block objects on the canvas 1002. When the user drops a selected control template (control block or strategy) onto the canvas area 1002, the strategy editor 202 displays a graphical representation based upon a currently preferred appearance object for the source block or strategy template.

Once placed within the strategy editor 202's canvas area 1002, the appearance objects associated with the deposited objects are fully accessible for editing using the appearance object editor 206. In summary of such functionality described herein above:

The user may add and remove attributes displayed on an appearance object

The user may change the location of an attribute displayed on an appearance object The user may select a preferred appearance object (for those objects that have multiple appearance objects defined)

Control Strategy Declarations/Connections

In an exemplary embodiment, connections between input and output parameters of control block objects within different strategies are facilitated by globally recognized variables referred to herein as "declarations". A declaration is an instance of a class created to model the information associated with a declaration. When a declaration is created, an instance of the class is created, and serialized to an attribute on the strategy object.

The declarations are identified in an Input Declarations area 1010 and an Output Declarations area 1012 of the graphical user interface of the strategy editor 202. On the canvas area 1002, the declarations (e.g., Primary, Secondary, Initialize, Output) are represented by tags connected to corresponding control object I/O attributes. A user creates input or output declarations for a strategy to support inter-block connections between blocks and nested strategies, and blocks in different strategies.

In an exemplary embodiment, as declarations are added to a strategy, the appearance object editor (running in the background) automatically updates corresponding appearance objects for the strategy. By way of example, the new Input declarations are added on the left side of the control strategy's appearance object and new output declarations are added on the right side. The appearance object for the strategy is not utilized unless the strategy is dropped into a containing strategy. However, if the strategy is dropped into another strategy canvas, then the currently preferred appearance object of the "child" strategy graphically represents the child strategy (including I/O declarations) in the canvas area for the containing strategy.

Turning to FIG. 10*a* a set of steps summarize the creation of a declaration within a strategy canvas. During step 1050 a user creates a declaration name under a name column of one of the declarations areas 1010 and 1012. The strategy editor supports adding new declarations to control objects within a control strategy by selecting the "+" button in the Input Declarations area 1010 and thereafter entering an input declaration name under the name field of a next available entry in the Input Declarations area 1010. A user deletes an input declaration by selecting the declaration of interest and selecting the "x" button in the Input Declarations area 1010. Similarly, a user adds a new declaration by selecting the "+" button in the Output Declarations area 1012 and thereafter entering an output declaration name. A user deletes an output declaration by selecting the output declaration of interest and selecting the "x" button in the Output Declarations area 1012.

Thereafter, a user connects the new declaration to an I/O attribute on a control object displayed in the canvas area 1002 through a set of GUI operations. During step 1060 the user selects the named declaration in the declaration area 1010 or 1012 and drags the declaration to the canvas area 1002. In response, the strategy editor automatically generates an input or output tag based upon the named declaration's type. A graphical tag (e.g., Primary tag) representation is rendered by the strategy editor 202 at the drop location in the canvas area 1002.

Thereafter, during step 1070 the user creates a connection between the graphical tag declaration and a graphically depicted I/O attribute on a block or child strategy appearance object using GUI-based pointer selection operations (e.g., click to select a source, move pointer to sink, and click to complete connection). A graphical connection is rendered to indicate the declaration/attribute connection. The strategy editor 202 updates the underlying object data structures corresponding to the graphically depicted declaration-to-attribute connection.

The above described steps only create the first of two points connected via the created declaration. To complete the overall connection, during step 1080 an association (referred to herein as a "connection reference") is created between the declaration and another suitable I/O attribute (e.g., a complimentary declaration for an I/O attribute on another strategy). Connections are utilized to connect the I/O declarations of a strategy to the I/O declarations of other strategies. Therefore, in an exemplary embodiment, in addition to a name, each declaration also supports a connection reference that is displayed in the declarations areas 1010 and 1012. When a connection reference is created for an input or output declaration, the connection reference is initialized with the string "- - - . - - -" or any other suitable indicator of an undefined value. A connection can be made between an Input declaration (or sink) and an Output declaration in another strategy (or source). If the strategy is a top-level strategy (i.e., directly connected to a compound), then the Input declaration may additionally be connected to an attribute on the compound itself. A connection reference for an Output declaration can only be specified for a block attribute on the strategy itself, or to another declaration in a child strategy. A user, by way of example, browses for a connection reference for a source declaration by double-clicking within the desired reference field to expose a browse button. Selecting the browse button invokes an Attribute Browser through which a user identifies and designates an appropriate I/O declaration to enter as the new declaration's connection reference.

Figure 11:
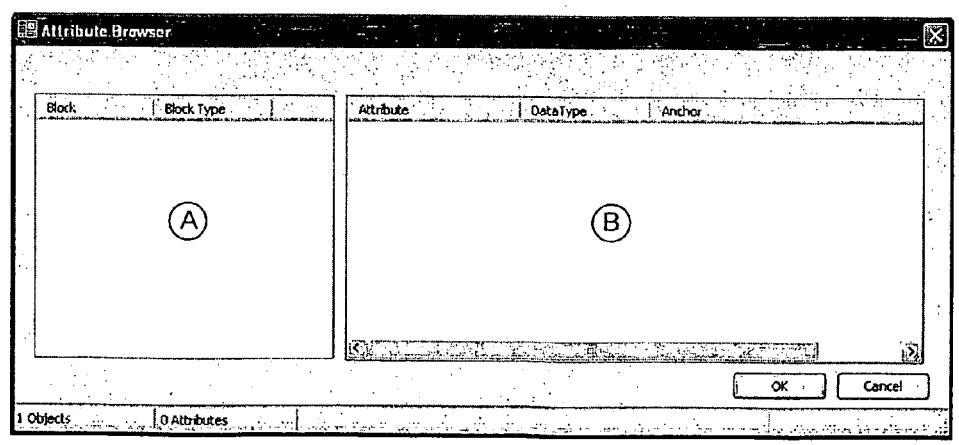
FIG. 11 illustratively depicts an exemplary graphical user interface for an attribute browser dialog.

Referring briefly to FIG. 11, an exemplary attribute browser interface is depicted. The Attribute Browser graphical interface initially displays all of the control objects to which the current strategy can connect on the left side ("A") of the browser. When a user selects an object appearing in the left side of the browser, the Attribute Browser displays any connectable attribute of the selected object in the right side ("B") of the browser. In the illustrative embodiment, the Attribute Browser allows a user to navigate to any declaration in a containing strategy or any declaration in a sibling strategy within the same containing strategy. If within a top-level strategy instance (i.e., no containing strategy), a user may browse any attribute within any compound in a global configuration database, or any declaration associated with any other top-level strategy instance within the global configuration database.

The strategy editor also supports establishing one or more hyperlinks to other strategies from any I/O declaration represented on the strategy canvas 1002. To create a hyperlink, a user invokes a context menu on an I/O declaration and selects a Create Hyperlink To menu option to invoke a Create Hyperlink To dialog. Using the Create Hyperlink To dialog, the user adds hyperlinks to one or more strategy instances in the configuration database 210 by selecting the Add button.

The strategy editor also supports navigating to a strategy specified as a hyperlink on an I/O declaration. A context menu for the I/O declaration includes a Navigate To menu option. After selecting the desired strategy appearing in the Navigate To dialog, the strategy editor 202 for the selected strategy is invoked and a graphical representation of the strategy is presented to the user on the strategy editor 202's graphical display.

Finally, as noted above, the strategy editor 202 is closely coupled to the appearance object editor 206. Therefore at step 1090, in association with creating the new declaration on the strategy (regardless of whether a connection reference is designated), the appearance object editor 206 opens corresponding appearance object definitions and adds the I/O attribute to the appearance objects.

The strategy editor 202 also supports streamlined establishment of connections, with customized connection type-specific appearances, between connectable attributes of control objects using graphical user interface actions (e.g., drag & drop). The strategy editor automatically determines the indicated I/O attributes and completes the connection by updating associated data structures on the affected control objects. In an exemplary embodiment, the strategy editor 202 supports automatic/graphically constructed connections between the following elements:

a. a connectable attribute of a control block or nested strategy and an input or output variable specified for the containing strategy b. a connectable attribute of a control block or nested strategy to another connectable attribute on a sibling I/A block or strategy within the same containing strategy Within the strategy editor 202, when the cursor/graphical pointer is placed over a potential source attribute, the cursor's appearance changes to an "okay to begin connection" state. A connection is established by placing the cursor over the source of the connection, selecting the source end (e.g., clicking), repositioning the cursor over an intended sink end, and then selecting the sink end (e.g., clicking). Furthermore, the strategy editor 202 provides visual feedback as a user repositions the cursor to select a sink end for the connection. For example, the strategy editor 202, upon detecting coincidence between the cursor and a potential connection sink attribute, changes the appearance of the cursor to an "okay to drop" state.

When the user selects the sink attribute on the user interface (by releasing a mouse button), strategy editor 202 auto-routes the graphical connection to form a path that avoids other displayed block and child strategy appearance objects. The resulting graphically displayed connections are represented by a single solid line on the canvas area 1002 of the strategy editor 202 that terminates with an arrowhead at the sink end.

Figure 12:
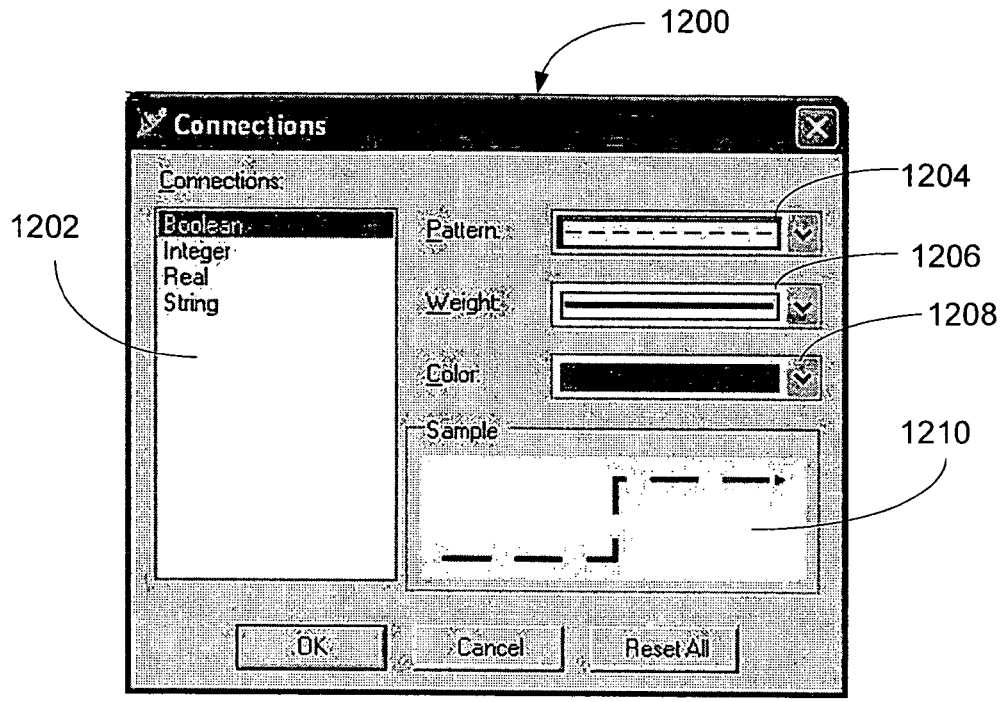
FIG. 12 illustratively depicts an exemplary connection appearance dialog for assigning styles to particular types of connections on a strategy editor canvas.

Furthermore, the appearance of a connection line is customizable. In addition to allowing a customer to manually select various line attributes (e.g., thickness, color, arrowhead type, style, etc.), the strategy editor 202 supports user defined/specified line characteristics/styles for particular classes of connections (e.g., data types of connected attributes). Turning to FIG. 12, an exemplary connection appearance definition dialog is presented. In the illustrative embodiment, the user opens the dialog from the control strategy using a menu command or alternatively selecting an appropriate entry from a context menu associated with the canvas area 1200. In the exemplary embodiment a connections dialog 1200 includes a connections box 1202 that lists a currently available set of connection types for which customized styles are supported. In the illustrative embodiment, a set of four different types of connections are listed (Boolean, Integer, Real and String) that concern the type of data conveyed via the connection. However, in alternative embodiments additional types of data are identified. Furthermore, the connection types are not limited to types of data. In alternative embodiments the connections can be based upon any characteristic that can be derived from the connected I/O attributes. Furthermore, embodiments of the strategy editor 202 support an extensible list of connection types for which line characteristics are defined.

A pattern drop-down list 1204 allows a user to designate a line pattern for a selected connection type (from the connections box 1202). The pattern drop-down list 1204 presents a variety of available patterns for a visually depicted connection on the canvas area 1002.

A weight drop-down list 1206 allows a user to designate a line thickness for a selected connection type (from the connections box 1202). The weight drop-down list 1206 presents a variety of available line thicknesses for a visually depicted connection on the canvas area 1002.

A color drop-down list 1208 allows a user to designate a color for a selected connection type (from the connections box 1202). The color drop-down list 1208 presents a variety of available line colors for a visually depicted connection on the canvas area 1002.

A sample box 1210 displays an example based upon user selections from the pattern, weight, and color lists 1204, 1206 and 1208.

A set of control buttons are also included. The OK and Cancel buttons close the dialog and either save the changes (OK) or ignore any changes made during the dialog session (Cancel). In an exemplary embodiment, a set of default characteristics are associated with each of the supported connection types. A "Reset All" button resets each of the supported connection types to the default values.

Figure 13:
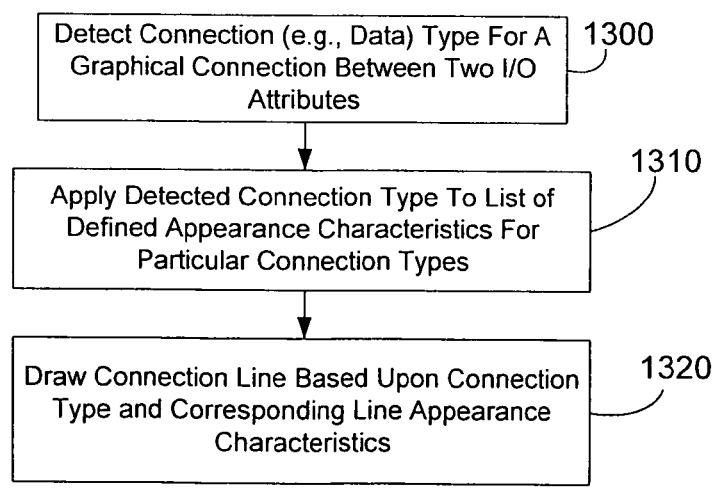
FIG. 13 is a flowchart summarizing steps for applying a pre-defined line appearance definition to a connection type.

Turning to FIG. 13, the strategy editor 202 applies the connection appearance characteristics (potentially modified via the Connections Dialog 1200) when a user creates a connection between two graphical appearance objects displayed upon the canvas 1002. In an exemplary embodiment, the strategy editor 202 senses the data type of the source attribute while a user is establishing a connection between two attribute connection points displayed upon the canvas 1002.

Referring to FIG. 13, during step 1300 the strategy editor 202 detects a data type for the connection during the course of defining the two endpoint attributes. This occurs, by way of example, upon selection of the source endpoint. Thereafter, at step 1310 the strategy editor determines the visual characteristics of the connection by applying the detected data type to a connection type/characteristic list. Thereafter, during step 1320 the strategy editor draws the line based upon the specified characteristics for the detected connection (e.g., data) type.

Yet another feature supported by the strategy editor 202 is an execution order designation interface that enables a user to manually program the order of execution of control block and child strategy objects graphically represented on the canvas area 1002. The default order of execution for control block and child strategy objects within a strategy is the order in which the objects are inserted by a user into the containing strategy. Furthermore, execution order is handled at a top layer of each object within a strategy. Therefore, when an execution order for a child strategy is specified, all blocks (and child strategies) contained within that child strategy execute prior to going to a next sibling object (i.e., block or another child strategy) in the execution order sequence for a strategy. If a control block or child strategy object is inserted into a containing strategy after an execution order has been established, the strategy editor 202 assigns an execution order value to the new block or child strategy object that is one ordinal position greater than the previous highest execution order value within the containing strategy.

The strategy editor 202 also supports an automated criterion-driven execution order assignment process. By way of example, a user initiates an automatic determination of execution order for the blocks and child strategies contained in a strategy by invoking an Auto Set Execution Order function from a context menu provided by the canvas area 1002. In an illustrative embodiment, the strategy editor 202 applies criterion based upon the block types (e.g., sequential versus continuous control blocks). In yet other embodiments, a user is provided a menu of various pre-defined criteria from which to choose. The subsequent execution order is driven by the user-selected criterion. The set of criteria is extensible and thus supports user defined supplementation to the set of pre-defined execution order assignment criteria.

In addition to automated designation of execution order for the objects represented in the canvas area 1002, the strategy editor supports manual designation of execution order on a control object basis. In particular, a user manually overrides a previously assigned execution order value for a block or child strategy on the canvas area 1002. In an exemplary embodiment, the user enters a manual execution order mode by invoking an Execution Order mode from a context menu on the canvas area 1002.

While in the Execution Order mode, the strategy editor 202 presents a Begin Sequence dialog that prompts the user to enter an ordinal value at which manual numbering is to commence (thus enabling a user to determine an ordinal position at which new ordinal value assignments will commence). The default beginning ordinal value is one.

While in the Execution Order mode, the strategy editor 202 highlights the execution order sequence number displayed within the title area of the default appearance object for each control block or nested child strategy object. The highlighted values signifying the current execution order value assigned to the associated control object. A user sequentially designates a preferred order of execution by clicking on the appearance objects displayed in the canvas area 1002 in the desired execution order. A first click on an appearance object assigns an execution order equal to the number specified on the Begin Sequence dialog.

The current execution order of any block or child strategy is continuously updated and displayed within the execution order area 601 of the appearance object during the reordering process. Thus, in an exemplary embodiment, the strategy editor 202 re-calculates all assigned execution order values on control objects that may have been affected by the particular selection. Each successive click on an appearance object results in assignment of a next higher ordinal value to a control object with which the selected appearance object is associated.

The following are examples of manually-specifying execution order:
  a. The user wants to insert a new block into position 2. After entering Execution Order mode, the user specifies 2 as the beginning sequence, and clicks on the desired block. All blocks and child strategies previously numbered from 2 up will be incremented by one.
  b. The user wants to switch the execution order of blocks 12 and 13. After entering Execution Order mode, the user specifies 12 as the beginning sequence, and clicks on the block previously numbered 13. Its execution order becomes 12, automatically incrementing the previous 12 to 13.

While in the Execution Order mode, the user specifies a new beginning sequence number by invoking a context menu on the canvas area 1002, and then selecting a Set Execution Sequence menu option.

Figure 14:
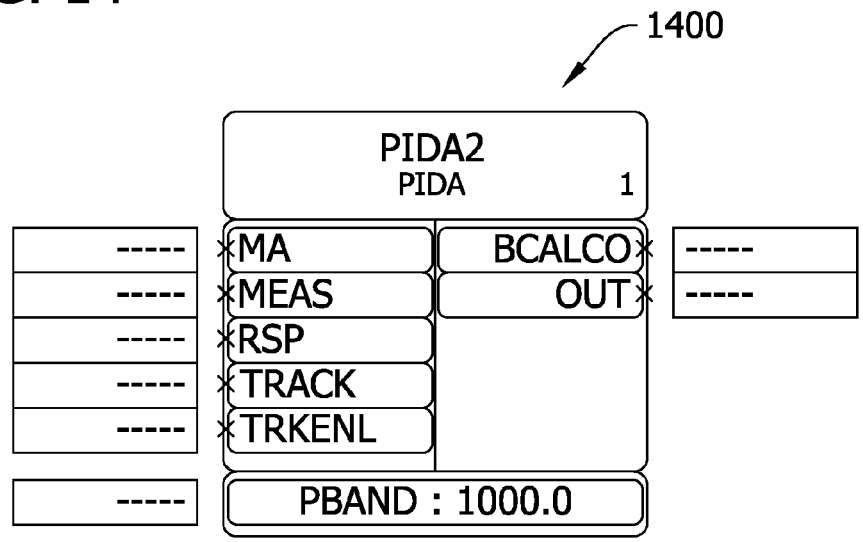
FIG. 14 illustratively depicts an exemplary graphical user interface for an appearance object in a live data display mode wherein live data for represented attributes is displayed proximate identified attributes.

In addition to creating and editing control programs, the strategy editor facility supports displaying live process data associated with attributes presented on rendered appearance objects. Turning to FIG. 14, after entering a Live Data Mode, the strategy editor 202 displays a rectangular register adjacent to each attribute displayed on the appearance objects on the canvas area 1002 corresponding to deployed control blocks and/or child strategies. Each rectangular register displays live data, to the extent available, obtained from deployed control blocks and child strategies corresponding to the appearance objects displayed in the canvas area 1002 of the strategy editor. Such data includes, by way of example, process sensor data transmitted by field devices that monitor process variables in an industrial process. Such data also potentially comprises setpoints or other user-settable values for a deployed control program. The live data registers support both reading and writing data. Therefore, a user potentially sets a new process variable setpoint via the live data registers.

The exemplary display in FIG. 14, depicts an initial state for a live data display mode appearance object 1400 within the canvas area 1002. In an illustrative embodiment, the status of information provided for associated attributes is indicated by the rectangular live data registers. For example, each live data register is initialized to display a character string " - - - ", indicating that associated attribute values are presently not defined. After a data communication link/path is established between the displayed attributes and a source of live data, current data values from the associated control blocks and child strategies (executing within deployed compounds) are displayed within each of the live data windows. The live data registers displayed next to attribute display elements on child strategies display the live data value of the ultimate end point to which the attribute is connected/linked, no matter how many layers deep strategy nesting occurs within a displayed appearance object for a strategy. Also, users cannot change a value to attributes on child strategies within a displayed strategy appearance object. However, they will be able to view the child strategy attribute values.

A user invokes an Update Parameters dialog to display a list of all of the attributes on a selected control block or child strategy and their current values. The Update Parameters dialog allows users to view live data values on attributes that don't appear on the appearance object of the block or strategy.

Figure 15:
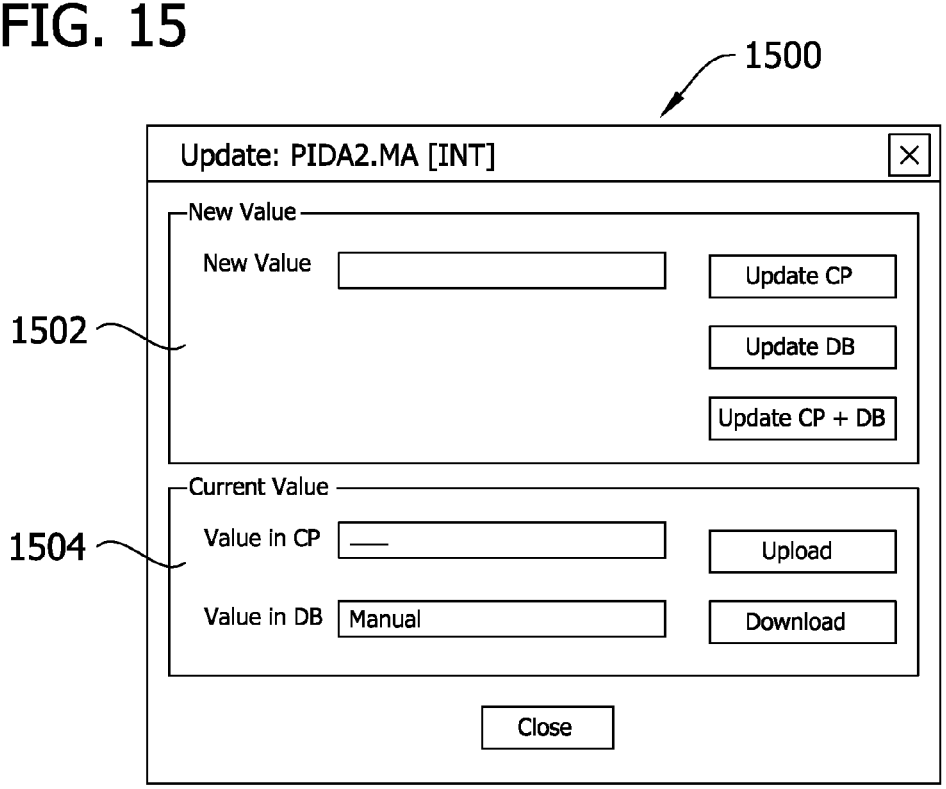
FIG. 15 illustratively depicts an exemplary graphical user interface for an Update Dialog that facilitates user-submitted changes to displayed attribute values.

A user invokes an Update dialog to change a current value for control attribute displayed in either the rectangular register adjacent the attribute on the canvas 1002 or the list of attributes in an Update Parameters dialog. The Update dialog is invoked, for example, by either double-clicking on the live data register for the desired attribute, or by double-clicking on the attribute within the Update Parameters dialog list. Referring to FIG. 15, the Update dialog user interface 1500 includes a New Value section 1502 and a Current Value section 1504. The New Value section 1502 enables a user to enter a new attribute value to update the operation of an associated controller, a value in the configuration database 210, or both. The Current Value section 1504 provides the current value for the attribute within the associated controller as well as the value stored in the configuration database 210.

The following summarizes the rules governing use of the Update dialog to change an attribute value. In order to update a block's attribute value in the configuration database 210, the attribute must be configurable. In order to update a block's attribute value on the controller, the attribute must be settable. Finally, if the block is not in Manual mode, only input attributes can be updated. Updates to output attributes will only be allowed when the block is in the Manual mode. No updates to connected sink attributes are permitted.

The structures, techniques, and benefits discussed above are merely exemplary embodiments of the invention carried out by software executed on computing machines and stored on computer-readable media in the form of computer executable instructions. In view of the many possible embodiments to which the principles of this invention may be applied, it should be recognized that the embodiments described herein with respect to the drawing figures are meant to be illustrative only and should not be taken as limiting the scope of invention. The illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. A method for creating, within a control program development editor facility, a connection between an I/O attribute of a control object of a first control strategy and a declaration, the control object having a graphical representation on a first control strategy canvas corresponding to the first control strategy, the method comprising the steps of:
    displaying a graphical user interface (GUI) of the editor facility, the GUI comprising the first control strategy canvas and a declarations area, the first control strategy canvas and the declarations area being displayed on the GUI simultaneously adjacent each other;
    identifying one or more declarations available to the first control strategy in the declarations area;
    selecting at least one of the declarations from the declarations area of the GUI of the editor facility;
    creating a graphical declaration representation of the declaration in response to a user action of selecting the declaration from the declarations area and indicating a location for the graphical declaration representation of the selected declaration on the first control strategy canvas;
    creating a connection between the selected declaration as represented by the graphical declaration representation and an I/O attribute of the control object on the first control strategy canvas using graphical user interface pointer actions, wherein the connection between the selected declaration and the I/O attribute is graphically represented on the first control strategy canvas by a line connecting a graphical representation of the I/O attribute and the graphical declaration representation; and
    automatically detecting the type of the connection and applying appearance characteristics to the line according to user defined connection appearance characteristics based on the type of connection.

2. The method of claim 1 further comprising the step of completing the connection between the I/O attribute on the first control strategy and a complimentary declaration by specifying the complimentary declaration as a connection reference for the selected declaration in the declarations area.

3. The method of claim 2 wherein the complimentary declaration is associated with a second graphical declaration representation on a second control strategy canvas depicting the second control strategy.

4. The method of claim 1 further comprising the step of inserting a reference to the first control strategy declaration in a second control strategy canvas corresponding to a second control strategy.

5. The method of claim 4, further comprising the step of synchronizing the control objects in a control program database with a user change made to the control program in a graphical declaration in the first or second control strategy canvas.

6. The method of claim 1 further comprising the step of creating a hyperlink associated with the declaration in the first control strategy canvas which enables navigation to a second control strategy canvas corresponding to a second control strategy.

7. The method of claim 1 further comprising the step of determining an execution order in which to execute objects in the first control strategy automatically based on pre-defined criteria.

8. A control program development editor facility comprising:
    a graphical user interface (GUI) comprising a first control strategy canvas and a declarations area; and a memory device storing computer-executable instructions that, when executed, create a connection between an I/O attribute of a control object of a first control strategy and a declaration, the computer-executable instructions facilitating performing the steps of:
    displaying on the GUI the first control strategy canvas and the declarations area simultaneously adjacent to each other;
    identifying one or more declarations available to the first control strategy in the declarations area;
    selecting at least one of the declarations from the declarations area of the GUI;
    creating a graphical declaration representation of the declaration in response to a user action of selecting the declaration from the declarations area and indicating a location for the graphical declaration representation of the selected declaration on a first control strategy canvas corresponding to the first control strategy;
    creating a connection between the selected declaration as represented by the graphical declaration representation and the I/O attribute of the control object on the first control strategy canvas using graphical user interface pointer actions, wherein the connection between the declaration and the I/O attribute of the control object on the first control strategy canvas is graphically represented on the first control strategy canvas by a line connecting a graphical representation of the I/O attribute and the graphical declaration representation; and
    automatically detecting the type of the connection and applying appearance characteristics to the line according to user defined connection appearance characteristics based on the type of connection.

9. The control program development editor facility of claim 8 further comprising computer-executable instructions for completing the connection between the I/O attribute on the first control strategy and a complimentary declaration by specifying the complimentary declaration as a connection reference for the selected declaration in the declarations area.

10. The control program development editor facility of claim 9 wherein the complimentary declaration is associated with a second graphical declaration representation on a second control strategy canvas depicting a second control strategy.

11. The control program development editor facility of claim 8 further comprising computer-executable instructions for inserting a reference to the first control strategy declaration in a second control strategy canvas corresponding to a second control strategy.

12. The control program development editor facility of claim 11, further comprising computer-executable instructions for synchronizing the control objects in a control program database with a user change made to the control program in a graphical declaration in the first or second control strategy canvas.

13. The control program development editor facility of claim 8 further comprising computer-executable instructions for creating a hyperlink associated with the declaration in the first control strategy canvas which enables navigation to a second control strategy canvas corresponding to a second control strategy.

14. The control program development editor facility of claim 8 further comprising computer-executable instructions for determining an execution order in which to execute objects in the first control strategy automatically based on pre-defined criteria.

* * * * *